United States Patent
Kelley et al.

(10) Patent No.: US 12,378,455 B2
(45) Date of Patent: Aug. 5, 2025

(54) POLYORGANOSILOXANE HYBRID PRESSURE SENSITIVE ADHESIVE AND METHODS FOR THE PREPARATION AND USE THEREOF

(71) Applicant: Dow Silicones Corporation, Midland, MI (US)

(72) Inventors: Elizabeth Kelley, Midland, MI (US); Timothy Mitchell, Midland, MI (US); Jodi Mecca, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 561 days.

(21) Appl. No.: 17/797,478

(22) PCT Filed: Mar. 15, 2021

(86) PCT No.: PCT/US2021/022297
§ 371 (c)(1),
(2) Date: Aug. 4, 2022

(87) PCT Pub. No.: WO2021/216220
PCT Pub. Date: Oct. 28, 2021

(65) Prior Publication Data
US 2023/0103925 A1  Apr. 6, 2023

Related U.S. Application Data

(60) Provisional application No. 63/012,293, filed on Apr. 20, 2020.

(51) Int. Cl.
*C09J 183/04* (2006.01)
*C09J 7/38* (2018.01)

(52) U.S. Cl.
CPC ............ *C09J 183/04* (2013.01); *C09J 7/381* (2018.01)

(58) Field of Classification Search
CPC ........ C09J 183/04; C08L 51/085; C08L 83/00
See application file for complete search history.

(56) References Cited

U.S. PATENT DOCUMENTS

| | | | |
|---|---|---|---|
| 4,585,669 A | 4/1986 | Eckberg |
| 4,587,137 A | 5/1986 | Eckberg |
| 5,202,190 A | 4/1993 | Kantner et al. |
| 5,678,048 A | 10/1997 | Stewart et al. |
| 6,239,246 B1 | 5/2001 | Takahashi et al. |
| 6,541,109 B1 | 4/2003 | Kumar et al. |
| 6,562,324 B1 | 5/2003 | Kumar et al. |
| 6,733,884 B2 | 5/2004 | Brown |

(Continued)

FOREIGN PATENT DOCUMENTS

| | | |
|---|---|---|
| EP | 1277766 A2 | 1/2003 |
| JP | H01244008 A | 9/1989 |

(Continued)

*Primary Examiner* — Robert S Jones, Jr.
*Assistant Examiner* — Lily K Sloan
(74) *Attorney, Agent, or Firm* — Catherine U. Brown (57) ABSTRACT

A polydiorganosiloxane having a silicon bonded poly(meth)acrylate polymer or copolymer is useful in a polyorganosiloxane hybrid pressure sensitive adhesive composition that cures to form a polyorganosiloxane hybrid pressure sensitive adhesive. An adhesive article including the polyorganosiloxane hybrid pressure sensitive adhesive is also disclosed.

14 Claims, 1 Drawing Sheet

(56) References Cited

U.S. PATENT DOCUMENTS

| | | |
|---|---|---|
| 8,258,243 B2 | 9/2012 | Yamada et al. |
| 9,052,440 B2 | 6/2015 | Kuyu et al. |
| 2008/0159970 A1* | 7/2008 | Willemin ............... A61K 8/585 |
| | | 424/59 |
| 2012/0095159 A1 | 4/2012 | Liu et al. |

FOREIGN PATENT DOCUMENTS

| | | |
|---|---|---|
| WO | 2007145996 A2 | 12/2007 |
| WO | 2008081913 A1 | 7/2008 |
| WO | 2019222440 A1 | 11/2019 |
| WO | 2020186127 A1 | 9/2020 |
| WO | 2020186129 A1 | 9/2020 |

* cited by examiner

Figure 1 (Reference)

POLYORGANOSILOXANE HYBRID PRESSURE SENSITIVE ADHESIVE AND METHODS FOR THE PREPARATION AND USE THEREOF

CROSS REFERENCE TO RELATED APPLICATIONS

This application is a U.S. national stage filing under 35 U.S.C. § 371 of PCT Application No. PCT/US21/022297 filed on 15 Mar. 2021, currently pending, which claims the benefit of U.S. Provisional Patent Application No. 63/012,293 filed 20 Apr. 2020 under 35 U.S.C. § 119(e). PCT Application No. PCT/US21/022297 and U.S. Provisional Patent Application No. 63/012,293 are each hereby incorporated by reference.

TECHNICAL FIELD

A polyorganosiloxane having a silicon bonded poly(meth)acrylate group (hereinafter, "poly(meth)acrylate grafted polyorganosiloxane") is useful in a radical reaction curable polyorganosiloxane hybrid pressure sensitive adhesive (hybrid PSA) composition. Methods for making and using a hybrid PSA from the above-mentioned composition are also disclosed.

BACKGROUND

Polyorganosiloxanes and acrylates have been used as bases for pressure sensitive adhesives. There is an industry need to provide pressure sensitive adhesives with properties of both polyorganosiloxanes and acrylates.

Acrylic chains can be incorporated onto polydimethylsiloxane backbones using free-radical polymerization by performing the polymerization in the presence of mercapto-functional polydimethylsiloxanes. The mercapto group will act as a chain-transfer agent and enable acrylic chains to be grafted onto the polydimethylsiloxane chain as pendant and/or end groups. However, if a mercapto-functional polydimethylsiloxane also contained vinyl or other aliphatically unsaturated monovalent hydrocarbyl functionality, the system may become saturated or crosslinked due to reaction of the aliphatically unsaturated groups during the free radical polymerization. Furthermore, as chain-transfer is a kinetically controlled process, grafting efficiency may be low due to the low level of mercapto-functionalization. Therefore, an improved process for manufacturing a poly(meth)acrylate grafted polyorganosiloxane is desired.

SUMMARY

A polyorganosiloxane hybrid pressure sensitive adhesive (hybrid PSA) composition comprises: (I) a pressure sensitive adhesive base comprising a physical mixture of starting materials (I-A) and (I-B), a reaction product of starting materials (I-A) and (I-B), or a combination of both the physical mixture and the reaction product, in an amount sufficient to provide 15 weight % to 40 weight % of starting material (I-A) and 5 weight % to 60 weight % of starting material (I-B); where starting material (I-A) is a functional polyorganosiloxane having poly(meth)acrylate groups, wherein said functional polyorganosiloxane comprises unit formula: $[R^3_w(R^5-S-R'')(OR^4)_{(2-w)}Si-O_{1/2}]_p[R^3_v(R^5-S-R'')(OR^4)_{(1-v)}Si-O_{2/2}]_q[(R^5-S-R'')Si-O_{3/2}]_k(R^6R^7_2SiO_{1/2})_r(R^7_2SiO_{2/2})_s(R^6R^7SiO_{2/2})_t(R^7_3SiO_{1/2})_u$, where each subscript w is independently 0, 1, or 2, each subscript v is independently 0 or 1, each $R^3$ is an independently selected monovalent hydrocarbon group; each $R^4$ is an independently selected alkyl group; each $R^5$ is an independently selected divalent hydrocarbon group, each R" is independently a (meth)acrylate polymer or copolymer, each $R^6$ is selected from the group consisting of a hydroxyl group and an aliphatically unsaturated monovalent hydrocarbon group, each $R^7$ is an independently selected monovalent hydrocarbon group free of aliphatic unsaturation, subscript p≥0, subscript q≥0, subscript k≥0, a quantity (p+q+k)≥1, subscript r≥0, subscript s≥0, subscript t≥0, subscript u≥0, a quantity (r+t)≥1, and a quantity (p+q+k+r+s+t+u) is sufficient to provide a molecular weight of at least 50 kDa to the polyorganosiloxane; and starting material (I-B) is a polyorganosilicate resin comprising unit formula $(R^{15}_2R^{16}SiO_{1/2})_x(R^{15}_3SiO_{1/2})_y(SiO_{4/2})_z$, where $R^{15}$ is an alkyl group, an aryl group, or an aralkyl group, such as methyl and phenyl; and $R^{16}$ is an alkenyl group of 2 to 18 carbon atoms, such as vinyl, allyl or hexenyl; subscripts x, y, and z are mole fractions; subscript x≥0, subscript y≥0, subscript z>0, a quantity (x+y)>0, a quantity (x+y+z)≤1, subscripts x, y, and z have values such that 0.9≤(x+y)/z≤1.3; the polyorganosilicate resin further comprises a hydroxyl group content up to 5 weight % based on weight of the polyorganosilicate resin; and the polyorganosilicate resin has a number average molecular weight>1,500 Da measured by gel permeation chromatography;

(II) a peroxide catalyst, wherein when each $R^6$ in starting material (A) is hydroxyl then the peroxide catalyst is present in an amount of 2 weight % to 4 weight %, and when each $R^6$ in starting material (A) is the aliphatically unsaturated monovalent hydrocarbon group then the peroxide catalyst is present in an amount of 3 weight % to 4 weight %; and 0 to 70 weight % of (III) a solvent; wherein all percentages are by weight based on combined weights of all starting materials in the polyorganosiloxane hybrid pressure sensitive adhesive composition.

The hybrid PSA composition described above may be used to prepare an adhesive article in a method comprising:
1) coating the hybrid PSA composition on a surface of a substrate, and
2) curing the hybrid PSA composition to form a hybrid PSA on the surface of the substrate.

BRIEF DESCRIPTION OF THE DRAWINGS

In FIG. 2, a bis-vinyl-terminated polydimethylsiloxane, a bis-hydroxyl terminated polydimethylsiloxane, and the alkoxysilyl-functional (meth)acrylate macromonomer prepared in Scheme 1 in FIG. 1 are reacted in the presence of a phosphazene catalyst and solvent (toluene) to form the bis-vinyl-terminated poly(meth)acrylate grafted polyorganosiloxane with the unit formula shown in the figure.

In FIG. 3, a bis-hydroxyl-terminated polydimethylsiloxane and the alkoxysilyl-functional (meth)acrylate macromonomer prepared in Scheme 1 in FIG. 1 are reacted in the presence of a phosphazene catalyst and solvent (toluene) to form the bis-hydroxyl-functional grafted poly(meth)acrylate grafted polyorganosiloxane with the unit formula shown in the figure.

DETAILED DESCRIPTION

A method is disclosed for making a product comprising a poly(meth)acrylate grafted polyorganosiloxane. The method comprises:
I) combining starting materials comprising:
A) an alkoxysilyl-functional (meth)acrylate macromonomer;
B) a polydiorganosiloxane selected from the group consisting of
B1) an unsaturated polydiorganosiloxane having, per molecule, at least one silicon bonded aliphatically unsaturated group;
B2) a hydroxyl-functional polydiorganosiloxane having, per molecule, at least two silicon bonded hydroxyl groups, and
B3) a combination of B1) and B2);
C) a condensation reaction catalyst;
optionally D) a polydialkylsiloxane; and
optionally E) a solvent; thereby making the product comprising the poly(meth)acrylate grafted polyorganosiloxane and a by-product;
II) removing all or a portion of the by-product during and/or after step I);
optionally III) neutralizing the product; and
optionally IV) recovering the poly(meth)acrylate grafted polyorganosiloxane.

Step I) in the method may be performed by any convenient means such as mixing. Step I) may be performed under inert conditions, e.g., nitrogen or other inert gas. Combining the starting materials may be performed at elevated temperature, e.g., heating at 80° C. to 120° C. Solvent may optionally be added, e.g., to facilitate combining the starting materials. Combining the starting materials may be performed with any order of addition, for example combining A) the alkoxysilyl-functional (meth)acrylate macromonomer, B) the polydiorganosiloxane (e.g., either or both of B1) the unsaturated polydiorganosiloxane, and B2) the hydroxyl-functional polydiorganosiloxane) and/or D) the polydialkylsiloxane. The resulting mixture may then be heated, and thereafter, C) the condensation reaction catalyst may be added, optionally dissolved in E) the solvent. Without wishing to be bound by theory, it is thought that adding E) the solvent may be beneficial to make a poly(meth)acrylate grafted polyorganosiloxane with high MW. When the starting materials react, a by-product is produced. The by-product may comprise water and/or alcohol (such as methanol). All or a portion of the by-product may be removed during and/or after step I). Without wishing to be bound by theory, it is thought that removing by-product may drive the reaction to completion and/or facilitate increasing MW. By-product may be removed by any convenient means, such as stripping.

Step III) in the method is neutralizing the product. Neutralizing may be performed by adding F) a neutralizing agent to the product during or after step II). Neutralizing may be performed at ambient or elevated temperature. Step IV) in the method is recovering the poly(meth)acrylate grafted polyorganosiloxane. Recovering the poly(meth)acrylate grafted polyorganosiloxane may be performed by any convenient means, such as filtration, stripping, and/or distillation. The starting materials used in the method described above are as follows.

Starting material A), the alkoxysilyl-functional (meth)acrylate macromonomer used in the method described above may have formula A-1):

where each $R^3$ is an independently selected monovalent hydrocarbon group; each $R^4$ is an independently selected alkyl group; $R^5$ is a divalent hydrocarbon group; R" is a (meth)acrylate polymer or copolymer, and subscript a is 0, 1 or 2. R" may have a DP of 1 to 1,000, and alternatively 5 to 600. Alternatively, the alkoxysilyl-functional (meth)acrylate macromonomer may have formula A-2):

where each $R^1$ is independently selected from the group consisting of hydrogen and an alkyl group; $R^2$ is independently selected from the group consisting of hydrogen, an alkyl group, an aryl group, and an aralkyl group; subscript n is 1 to 1,000; and $R^3$, $R^4$, and $R^5$ are as described above.

Alternatively, in formula A-2), subscript n may be 5 to 600. Suitable alkyl groups for $R^1$ may be alkyl groups of 1 to 4 carbon atoms; alternatively methyl or ethyl. Alternatively, each $R^1$ may be methyl. Suitable alkyl groups for $R^2$ may have 1 to 18 carbon atoms, alternatively 1 to 8 carbon atoms. Suitable alkyl groups for $R^2$ include methyl, ethyl, propyl, and butyl. Suitable aryl groups for $R^2$ have 6 to 18 carbon atoms and include phenyl, and suitable aralkyl groups for $R^2$ have 6 to 18 carbon atoms and include styryl. Alternatively, in formula A-2) each $R^2$ may be an independently selected alkyl group of 1 to 18 carbon atoms, alternatively 1 to 8 carbon atoms.

Alternatively, in formulae A-1) and A-2), subscript a may be 1 or 2, alternatively 1, and alternatively 2. Each $R^3$ may be an independently selected monovalent hydrocarbon group of 1 to 18 carbon atoms. Suitable monovalent hydrocarbon groups for $R^3$ include alkyl groups (e.g., methyl, ethyl, propyl and butyl) and alkenyl groups (e.g., vinyl, allyl and hexenyl), aryl groups such as phenyl, and aralkyl groups such as benzyl, tolyl, xylyl, and phenylethyl. Alternatively, each $R^3$ may be independently selected from the group consisting of alkyl and alkenyl. Alternatively, each $R^3$ may be an alkyl group of 1 to 8 carbon atoms. Alternatively, each $R^3$ may be selected from the group consisting of methyl and vinyl.

Each $R^4$ may be an independently selected alkyl group of 1 to 6 carbon atoms. Suitable alkyl groups for $R^4$ include methyl, ethyl, propyl, and butyl; alternatively methyl.

Each $R^5$ may be a divalent hydrocarbon group of 1 to 18 carbon atoms.

Suitable divalent hydrocarbon groups for $R^5$ include alkylene groups such as ethylene (—CH$_2$—CH$_2$—), propylene such as —CH$_2$—CH$_2$—CH$_2$— or —CH(CH$_3$)CH$_2$—), butylene, or hexylene; an arylene group such as phenylene, or an alkarylene group such as:

Alternatively, $R^5$ may be an alkylene group of 2 to 6 carbon atoms, such as propylene.

Starting material (A), the alkoxysilyl-functional (meth) acrylate macromonomer, may have a glass transition temperature (Tg) greater than −52° C. as calculated using the Fox equation.

$$\frac{1}{T_{g,Fox}} = \frac{w_1}{T_{g,1}} + \frac{w_2}{T_{g,2}}$$

Where $T_{g,Fox}$ is the glass transition of the copolymer, $T_{g,x}$ is the glass transition of the homopolymer x, and $w_x$ is the weight fraction of x in the copolymer.

The amount of starting material A) used in the method for making the product comprising the poly(meth)acrylate grafted polyorganosiloxane described above depends on various factors, however, starting material A) may be used in an amount of 4% to 11% based on combined weights of starting materials A) and B) in the method. Alternatively, the amount of starting material A) may be 1% to 50%, alternatively 5% to 10%, alternatively 5% to 9%, on the same basis.

Alkoxysilyl-functional (meth)acrylate monomers suitable for use as starting material A) may be prepared by known methods, such as that disclosed in U.S. Pat. No. 6,733,884 to Brown. Alternatively, the alkoxysilyl-functional (meth) acrylate may be prepared by a method comprising:

1) combining starting materials comprising i) a (meth)acrylate monomer of formula where $R^1$ and $R^2$ are as described above;

ii) a mercapto-functional alkoxysilane of formula where $R^3$, $R^4$, $R^5$ and subscript a are as described above;
  optionally iii) a free radical initiator; and
  optionally iv) a solvent; thereby making a product comprising an alkoxysilyl-functional (meth)acrylate macromonomer; and
  optionally 2) recovering A) the alkoxysilyl-functional (meth)acrylate macromonomer.

In this method, i) the (meth)acrylate monomer may be combined with iv) the solvent, when present, before step 1). The solvent may optionally be dried before combining with starting material i) and/or any other starting materials. Alternatively, i) the (meth)acrylate monomer, ii) the mercapto-functional alkoxysilane, and iv) the solvent, when present, may be combined before step 1). The resulting combination may be heated, e.g., to 50° C. to 150° C. in a reactor. The reaction of starting materials i) and ii) may proceed with sufficient heating to generate free radicals. Alternatively, iii) the free radical initiator, optionally dissolved in iv) solvent, may be added to the reaction vessel. Step 1) may be performed under inert conditions, e.g., by purging the reactor with nitrogen. The starting materials in step 1) may be combined with mixing, heating, or both. For example, mixing and heating may be performed by mixing while heating from 50° C. to reflux temperature of the starting materials, alternatively 50° C. to 150° C., alternatively 50° C. to 110° C.; alternatively 50° C. to 100° C.; alternatively 75° C. to 85° C. for 1 to 6 hours. The starting materials may be added in any order, however, the iii) free radical initiator may be dissolved in iv) the solvent and optionally combined with i) the (meth)acrylate monomer, and the resulting combination may then be added into a reactor containing ii) the mercapto-functional alkoxysilane. Alternatively, i) the (meth)acrylate monomer and ii) the mercapto-functional alkoxysilane may be combined to form a mixture, and thereafter iii) the free radical initiator may be added to the mixture. Without wishing to be bound by theory, it is thought that the resulting alkoxysilyl-functional (meth)acrylate macromonomer (made with this order of addition) will have a different molecular weight distribution than when a different order of addition is used.

Step 2), recovering the alkoxysilyl-functional (meth)acrylate macromonomer may be performed by any convenient means, such as cooling the reaction product prepared in step 1) to RT, and precipitation in a non-solvent (such as an alkane such as hexanes or an alcohol such as methanol) which will precipitate the alkoxysilyl-functional (meth)acrylate macromonomer. Recovering may optionally further comprise drying the precipitate, such as by heating at ambient or reduced pressure with heat, e.g., from 80° C. to 100° C. to drive off residual monomer, solvent, or both.

In the method for preparing the alkoxysilyl-functional (meth)acrylate macromonomer starting material i) is a (meth)acrylate monomer. Suitable (meth)acrylate monomers have formula i-1):

where $R^1$ and $R^2$ are as described above. Suitable (meth)acrylate monomers are known in the art and are commercially available, and some examples are shown in Table 1. The amount of starting material i) may be 20% to 99.8%, alternatively 30% to 90%, and alternatively 70% to 75% based on combined weights of starting materials i), ii), iii), and iv).

TABLE 1

Exemplary (Meth)acrylate Monomers

| Abbreviation | (Meth)acrylate Monomer | $T_g$, ° C. of homo-polymer[a] | Commercial Source |
|---|---|---|---|
| AA | Acrylic Acid | 101 | Millipore Sigma |
| BA | Butyl Acrylate | −53 | Millipore Sigma |
| BMA | Butyl Methacrylate | 20 | Millipore Sigma |
| 2-EHA | 2-Ethylhexyl Acrylate | −52 | Millipore Sigma |
| EHMA | 2-Ethylhexyl Methacrylate | 77 | Millipore Sigma |
| IBA | Isobutyl Acrylate | −33 | Millipore Sigma |
| IBMA | Isobutyl Methacrylate | 57 | Millipore Sigma |
| MMA | Methyl Methacrylate | 105 | Millipore Sigma |
| MAA | Methacrylic Acid | 228 | Millipore Sigma |
| BzMA | benzyl methacrylate | 55 | Millipore Sigma |
| PMA | phenyl methacrylate | 110 | Millipore Sigma |

[a]Tg from Polymer Properties Database (polymerdatabase.com).

In the method for preparing the alkoxysilyl-functional (meth)acrylate macromonomer starting material ii) is a mercapto-functional alkoxysilane. The mercapto-functional alkoxysilane may have formula ii-1):

where subscript a and $R^3$, $R^4$, and $R^5$ are as described above. Suitable mercapto-functional alkoxysilanes are known in the art and are commercially available. These include 3-mercaptopropyltrimethoxysilane, 3-mercaptopropyltriethoxysilane, 11-mercapto undecyltrimethoxysilane, (mercaptomethyl)methyldiethoxysilane, 3-mercaptopropylmethyldimethoxysilane all of which are commercially available from Gelest, Inc. of Morrisville, Pennsylvania, USA. Alternatively, mercapto-functional alkoxysilanes such as those described above as well as mercapto-functional monoalkoxysilanes, e.g., 3-mercaptopropyldimethylmethoxysilane and 3-mercaptopropyldimethylethoxysilane, may be synthesized by known methods such as those disclosed in U.S. Patent Application 2005/0124821 and Agina, E. V., ACS Applied Materials & Interfaces, 2015, 22, 11755-11764. The amount of starting material ii) may be 0.1% to 50%, alternatively 1% to 10%, and alternatively 1% to 8%, based on combined weights of starting materials i), ii), iii), and iv).

Starting material iii) for preparing the alkoxysilyl-functional (meth)acrylate macromonomer is a free radical initiator. The free radical initiator may be selected from the group consisting of iii-1) an azo compound, iii-2) a peroxide, (e.g., a hydroxyperoxide, a peracid, and a perester, such as a tert-alkyl peroxypivalate), and iii-3) a combination thereof. Suitable free radical initiators are known in the art, see for example, U.S. Pat. No. 8,258,243 col. 2, lines 9-34. Alternatively, suitable free radical initiators are commercially available. For example, tert-alkyl peroxypivalates are commercially available from Akzo Nobel, e.g., tert-amyl peroxypivalate is available as Trigonox 125-C75 and tert-butyl peroxypivalate is available as Trigonox 25-C75. The amount of starting material iii) may be 0 to 5%, alternatively 0.1% to 2%, and alternatively 1% to 2%, based on combined weights of starting materials i), ii), iii), and iv).

A solvent may be used in the method described above. One or more of the starting materials for use in making the alkoxysilyl-functional (meth)acrylate macromonomer may be dissolved in iv) a solvent before combining with the other starting materials. For example, the free radical initiator may be dissolved in mineral spirits. Alternatively, the solvent may be selected from the group consisting of iv-1) a hydrocarbon with a boiling point above 100° C. (e.g., an aromatic hydrocarbon such as toluene or xylene), iv-2) a polar solvent (such as acetone, methyl ethyl ketone, methyl acetate, ethyl acetate, acetonitrile, methanol, isopropanol or tert-butanol), iv-3) a silicone oil (e.g., the silicone oil may be a polydialkylsiloxane, as described below), and iv-4) a combination of two or more thereof. Alternatively, the solvent may be toluene, for example, to facilitate combination of starting material A) with the other starting materials to make the poly(meth)acrylate grafted polyorganosiloxane. When a polydialkylsiloxane is used as a solvent, the polydialkylsiloxane may act as a starting material in the method for making the product comprising the poly(meth)acrylate grafted polyorganosiloxane. When toluene is used, no solvent exchange may be included in the method for making the product comprising the poly(meth)acrylate grafted polyorganosiloxane. The amount of starting material iv) may be 0 to 70%, alternatively 0 to 25%, based on combined weights of starting materials i), ii), iii), and iv).

In the method for making the product comprising the poly(meth)acrylate grafted polyorganosiloxane, starting material B) is a polydiorganosiloxane. The polydiorganosiloxane is selected from the group consisting of B1) an unsaturated polydiorganosiloxane having, per molecule, at least one silicon bonded aliphatically unsaturated group, B2) a hydroxyl-functional polydiorganosiloxane having, per molecule, at least two silicon bonded hydroxyl groups, and B3) a combination of both B1) and B2). When the starting material B1) is used, the poly(meth)acrylate grafted polyorganosiloxane has both silicon bonded aliphatically unsaturated groups and silicon bonded poly(meth)acrylate groups.

Starting material B1) is an unsaturated polydiorganosiloxane having, per molecule, at least one silicon bonded aliphatically unsaturated group. The aliphatically unsaturated group may be in a terminal position, a pendant position, or both terminal and pendant positions.

Starting material B1), the unsaturated polydiorganosiloxane, may comprise unit formula B1-1): $(R^6R^7{}_2SiO_{1/2})_b$ $(R^7{}_2SiO_{2/2})_c(R^6R^7SiO_{2/2})_d(R^7{}_3SiO_{1/2})_e$ $(R'OR^7{}_2SiO_{1/2})_f$ $(R'OR^7SiO_{2/2})_g$, where each $R^6$ is an independently selected aliphatically unsaturated hydrocarbon group, each $R^7$ is an independently selected monovalent hydrocarbon group free of aliphatic unsaturation, each R' is independently selected from the group consisting of H and $R^7$, subscript b is 0, 1, or 2, subscript c≥1, subscript d≥0, subscript e is 0, 1, or 2, subscript f is 0, 1, or 2, and subscript g≥0, with the provisos that a quantity (b+d)≥1, a quantity (b+e+f)=2, and a quantity (b+c+d+e+f+g) is at least 3, alternatively 3 to 250.

Aliphatically unsaturated hydrocarbon groups for $R^6$ may have 2 to 18 carbon atoms and are exemplified by alkenyl, such as vinyl, allyl or hexenyl; and alkynyl, such as propynyl, butynyl or hexynyl. Alternatively, each $R^6$ may be an alkenyl group. Alternatively, each $R^6$ may be a vinyl group.

Monovalent hydrocarbon groups free of aliphatic unsaturation for $R^7$ may have 1 to 18 carbon atoms and are exemplified by alkyl groups, aryl groups, and aralkyl groups; alternatively alkyl groups and aryl groups. Suitable alkyl groups include methyl, ethyl, and propyl; alternatively methyl. Suitable aryl groups include phenyl. Alternatively, each $R^7$ may be an alkyl group, such as methyl.

Alternatively, in unit formula B1-1), subscript b may be 0 or 2, subscript e may be 0 or 2, and subscript g may be 0. Alternatively, subscript c may be 1 to 250, subscript d may be 0 to 1, subscript g may be 0 to 1, and a quantity (c+d+g) may be 1 to 250. Alternatively, the quantity (b+e) may be 2. Alternatively, subscript c may be 1 to 100, alternatively 10 to 75, alternatively 25 to 75, and alternatively 30 to 60. Alternatively, subscript d may be 0 to 50, alternatively 0 to 25 alternatively 0 to 10, alternatively 0 to 5. Alternatively, subscript g may be 0 to 50, alternatively 0 to 25 alternatively 0 to 10, alternatively 0 to 5. Subscript b is 0 to 2, alternatively subscript b may be 0, and alternatively subscript b may be 2. Subscript e is 0 to 2, alternatively subscript e may be 0, and alternatively subscript e may be 2. Subscript f is 0 to 2, alternatively subscript f may be 0, and alternatively, subscript f may be 2.

Starting material B1) may contain both silicon bonded aliphatically unsaturated hydrocarbon groups and silicon bonded hydroxyl groups. Examples of starting material B1) containing both silicon bonded aliphatically unsaturated groups and silicon bonded hydroxyl groups include an OH-terminated polymethylvinylsiloxane and an OH-terminated poly(dimethyl/methylvinyl)siloxane copolymer, which is commercially available from Gelest. See for example, "Gelest Reactive Silicones: Forging New Polymer Links", 2016, https://www.gelest.com/wp-content/uploads/Reactive-Silicones-No-Price-2016.pdf, at page 11. Alternatively, starting material B1) may have silicon bonded aliphatically unsaturated hydrocarbon groups, silicon bonded hydroxyl groups, and silicon bonded alkoxy groups. Examples of such material include DOWSIL™ 4-7042, which is a mixture of hydroxyl-terminated, poly(dimethyl, methylvinyl siloxane) and alpha-hydroxyl-terminated, omega-methoxy-terminated, poly(dimethyl, methylvinyl siloxane) commercially available from Dow Silicones Corporation of Midland, Michigan, USA. When starting material B1) contains both silicon bonded aliphatically unsaturated hydrocarbon groups and sufficient silicon bonded hydroxyl groups, then starting material B2) the hydroxyl-functional polydiorganosiloxane is optional.

Alternatively, in unit formula B1-1) above, a quantity (f+g) may be less than 2 (such that starting material B1) may have less than 2 silicon bonded hydroxyl groups per molecule). Examples of suitable unsaturated polydiorganosiloxanes include B-i) dimethylvinylsiloxy-terminated polydimethylsiloxane,
B-ii) dimethylvinylsiloxy-terminated poly(dimethylsiloxane/methylvinylsiloxane),
B-iii) dimethylvinylsiloxy-terminated polymethylvinylsiloxane,
B-iv) trimethylsiloxy-terminated poly(dimethylsiloxane/methylvinylsiloxane),
B-v) trimethylsiloxy-terminated polymethylvinylsiloxane,
B-vi) dimethylvinylsiloxy-terminated poly(dimethylsiloxane/methylvinylsiloxane),
B-vii) dimethylvinylsiloxy-terminated poly(dimethylsiloxane/methylphenylsiloxane),
B-viii) dimethylvinylsiloxy-terminated poly(dimethylsiloxane/diphenylsiloxane),
B-ix) phenyl,methyl,vinyl-siloxy-terminated polydimethylsiloxane,
B-x) dimethylhexenylsiloxy-terminated polydimethylsiloxane,
B-xi) dimethylhexenylsiloxy-terminated poly(dimethylsiloxane/methylhexenylsiloxane),
B-xii) dimethylhexenylsiloxy-terminated polymethylhexenylsiloxane,
B-xiii) trimethylsiloxy-terminated poly(dimethylsiloxane/methyl hexenylsiloxane),
B-xiv) trimethylsiloxy-terminated polymethylhexenylsiloxane
B-xv) dimethylhexenyl-siloxy terminated poly(dimethylsiloxane/methylhexenylsiloxane),
B-xvi) dimethylvinylsiloxy-terminated poly(dimethylsiloxane/methylhexenylsiloxane)
B-xvii) a combination thereof. Vinyl functional polydiorganosiloxanes are available, see for example, "Gelest Reactive Silicones: Forging New Polymer Links", 2016, https://www.gelest.com/wp-content/uploads/Reactive-Silicones-No-Price-2016.pdf, at pages 8-11 and 15-16. When starting material B1) does not contain sufficient silicon bonded hydroxyl groups, starting material B2) is used in the method described above. The amount of starting material B1) used in the method depends on various factors including on whether B1) has terminal, pendant, or both terminal and pendant aliphatically unsaturated groups. However, the amount of starting material B1) is sufficient to provide 0.1% to 10%, alternatively 0.1% to 2%, aliphatically unsaturated groups to all of the starting materials in step I) of the method for making the product comprising the poly(meth)acrylate grafted polyorganosiloxane. Alternatively, the amount of starting material B1) may be 0.5% to 5%, alternatively, 1% to 4%, and alternatively 1% to 3%, based on combined weights of starting materials A) and B). Alternatively, starting material B1) can be present in a higher amount, e.g., up to 90% when B1) had hydroxyl functional groups and starting material B2) is not used.

In the method for making the product comprising the poly(meth)acrylate grafted polyorganosiloxane, starting material B2) is a hydroxyl-functional polydiorganosiloxane having, per molecule, at least two silicon bonded hydroxyl groups. The hydroxyl groups may be in terminal positions, in pendant positions, or both. Starting material B2) may comprise unit formula B2-1): $(R^8_2SiO_{2/2})_h(R^8_3SiO_{1/2})_i(HOR^8_2SiO_{1/2})_j$, where each $R^8$ is an independently selected monovalent hydrocarbon group free of aliphatic unsaturation subscript j is 1 or 2, subscript i is 0 or 1, a quantity (j+i)=2, subscript h≥1, and a quantity (h+i+j) is at least 3, alternatively 3 to 250, and alternatively 3 to 100. Alternatively, subscript h may be 1 to 250, alternatively 1 to 100. Alternatively, i may be 0 and j may be 2. Monovalent hydrocarbon groups for $R^8$ include alkyl groups, aryl groups, and aralkyl groups; alternatively alkyl groups and aryl groups. Suitable alkyl groups include methyl, ethyl, and propyl; alternatively methyl. Suitable aryl groups include phenyl. Alternatively, each $R^8$ may be an alkyl group, such as methyl. Examples of starting material B2) include hydroxyl-terminated polydimethylsiloxane, hydroxyl-terminated poly(dimethyl/diphenyl)siloxane copolymers, hydroxyl-terminated poly(dimethyl/methylphenyl)siloxane copolymers. Alternatively, suitable bis-hydroxyl terminated polydimethylsiloxanes are commercially available from Dow Silicones Corporation of Midland, Michigan, USA. Exemplary hydroxyl functional polydiorganosiloxanes are commercially available, which include the silanol functional polymers in "Gelest Reactive Silicones: Forging New Polymer Links", 2016, https://www.gelest.com/wp-content/uploads/Reactive-Silicones-No-Price-2016.pdf, at pages 22 and 24-25. Starting material B2) may be used in an amount of 80% to 95%, alternatively 85% to 95% based on combined weights of starting materials A) and B); alternatively 87% to 94%, and alternatively 89% to 94%, on the same basis.

In the method for making the product comprising the poly(meth)acrylate grafted polyorganosiloxane, starting material C) is a phosphazene condensation reaction catalyst such as a phosphonitrile halide. Without wishing to be bound by theory, it is thought that cyclic siloxane by-products (such as octamethylcyclotetrasiloxane) formation may be minimized when the phosphazene condensation reaction catalyst is used in the method.

Phosphazene condensation reaction catalysts are exemplified by those disclosed in U.S. Pat. No. 9,051,428. Exemplary phosphazene condensation reaction catalysts may contain, per molecule at least one —(N=P<)— unit and may be an oligomer having up to 10 such phosphazene units, for example having an average of 1.5 to 5 phosphazene units. The phosphazene condensation reaction catalyst can for example be a halophosphazene, such as a chlorophosphazene (phosphonitrile chloride), an oxygen-containing halophosphazene, or an ionic derivative of a phosphazene such as a phosphazenium salt, such as an ionic derivative of a phosphonitrile halide, e.g., a perchlorooligophosphazenium salt.

One suitable type of phosphazene condensation reaction catalyst is an oxygen-containing halophosphazene, such as an oxygen-containing chlorophosphazene. Such an oxygen-containing chlorophosphazene can for example have the formula C-1):

or C-2):

In formula C-1) and C-2), subscript p can have an average value of 1 to 10, alternatively 1 to 5. The catalyst may also comprise tautomers of the catalyst of the formula C-2) Another type of suitable oxygen-containing chlorophosphazene has the formula C-3):

where $R^9$ represents an organosilicon moiety bonded to phosphorus via oxygen, for example a phosphazene catalyst of the formula C-4):

where each $R^{10}$ represents a monovalent hydrocarbon group having 1 to 18 carbon atoms or monovalent halogenated hydrocarbon group having 1 to 18 carbon atoms and subscript q has an average value of 1 to 10, alternatively 1 to 5. The catalyst may also comprise condensation products of such an organosilicon-containing phosphazene. All or some of the chlorine atoms in any of the above oxygen-containing phosphazenes can be replaced by radicals Q, in which Q represents a moiety selected from the group consisting of a hydroxyl group, a monovalent organic group, such as alkoxy or aryloxy, a halogen atom other than chlorine, an organosilicon group, and a phosphorus-containing group.

Another suitable type of phosphazene catalyst is a perchlorooligophosphazenium salt of the formula C-5):

where subscript o has an average value of 1 to 10, and $Z^-$ represents an anion. Alternatively, subscript o may have an average value of 1 to 6, and alternatively, subscript o may have an average value of 2. The anion may be a complex anion and can, for example, be of the formula $MX_{(v+1)}$ in which M is an element having an electronegativity on Pauling's scale of from 1.0 to 2.0 and valency v, and X is a halogen atom. The element M can, for example, be phosphorus or antimony, alternatively phosphorus. The halogen atom for X may be Cl. The anion $Z^-$ can alternatively be a complex anion of the formula $[MX_{(v-y+1)}R^{11}_y]^-$ where each $R^{11}$ is an independently selected alkyl group having 1 to 12 carbon atoms and subscript y has a value between 0 and v, as described in U.S. Pat. No. 5,457,220. Alternatively, in formula C-5), subscript o may have an average value of 2, and the anion $Z^-$ may be $PCl_6^-$.

The phosphazene condensation reaction catalyst may be present in an amount of 1 to 200, alternatively 2 to 200 parts per million based on the combined weight of starting materials A) and B), for example at 5 to 50 parts per million.

Starting material D) is an optional polydialkylsiloxane that may be added in step I) of the method for making the product comprising the poly(meth)acrylate grafted polyorganosiloxane. The polydialkylsiloxane may comprise unit formula D-1): $(R^{12}_2SiO_{2/2})_m(R^{12}_3SiO_{1/2})_2$, where each $R^{12}$ is an independently selected alkyl group, and subscript m is 1 to 250, alternatively 1 to 50. Suitable alkyl groups for $R^{12}$ include methyl, ethyl, and propyl; alternatively methyl. Examples of starting material D) include Di) trimethylsiloxy-terminated polydimethylsiloxane, Dii) triethylsiloxy-terminated polydiethylsiloxane, and Diii) combinations of Di) and Dii). Polydialkylsiloxanes are known in the art and are commercially available. For example, methyl silicone fluids such as trimethylsiloxy-terminated polydimethylsiloxanes are commercially available from Gelest, see for example, "Gelest: Silicone Fluids," https://www.gelest.com/themencode-pdf-viewer/?file=https://www.gelest.com:443/wp-content/uploads/Inert_Silicones.pdf, 2012, at pages 8-9 and from Dow Silicones Corporation of Midland, Mich. USA under the tradename DOWSIL™ 200 Fluids. Trimethylsiloxy-terminated polydimethylsiloxane and triethylsiloxy-terminated polydiethylsiloxane are available from Power Chemical Corporation of Jiangsu, China. The amount of starting material D) depends on various factors including the molecular weight of the polydialkylsiloxane selected, however, when used, the amount may be 1% to 10% based on weights of starting materials A) to D) used in the method.

Starting material E) is a solvent that may be used in the method described above. The solvent may be an aromatic hydrocarbon such as toluene or xylene; or ethyl acetate. The amount and type of solvent are selected so as to solubilize both polyorganosiloxane and (meth)acrylate polymer or copolymer. However, when present, the solvent may be used in an amount of 30% to 80%, alternatively 40% to 70%, based on combined weights of starting materials A), B), C), D), and E).

Starting material F) is a neutralizing agent that may optionally be used in step III) of the method for making the product comprising the poly(meth)acrylate grafted polyorganosiloxane described above. Starting material F) may be used to neutralize the product after the poly(meth)acrylate grafted polyorganosiloxane forms. If a neutralizing agent is used, any neutralizing agent suitable for the catalyst chosen can be used, see for example the neutralizing agents disclosed in U.S. Pat. No. 8,580,862. Without wishing to be bound by theory, it is thought that selection of neutralizing agent depends on pKa and solubility. Suitable neutralizing agents for phosphazene-based condensation catalysts include, but are not limited to, alkylamines such as trioctylamine, trimethylamine, triethylamine, trihexylamine, and triisononylamine. Neutralizing agents are known in the art and are commercially available, e.g., from Millipore Sigma of St. Louis, Missouri, USA. The amount of neutralizing agent depends on various factors including the amount of starting material C) the condensation catalyst, however, starting material F) may be present in an amount sufficient to provide a molar ratio of neutralizing agent to catalyst (F:C ratio) of 1:1 to 100:1, alternatively 1:1 to 30:1; and alternatively 1:1 to 20:1.

Poly(Meth)Acrylate Grafted Polyorganosiloxane

The method described above produces a poly(meth)acrylate grafted polyorganosiloxane. The poly(meth)acrylate grafted polyorganosiloxane comprises unit formula: $[R^3_w (R^5-S-R'')(OR^4)_{(2-w)}Si-O_{1/2}]_p [R^3_v (R^5-S-R'') (OR^4)_{(1-v)}Si-O_{2/2}]_q [(R^5-S-R'')Si-O_{3/2}]_k (R^6 R^7_2 SiO_{1/2})_r (R^7_2 SiO_{2/2})_s (R^6 R^7 SiO_{2/2})_t (R^7_3 SiO_{1/2})_u$, where each subscript w is independently 0, 1, or 2, each subscript v is independently 0 or 1, each $R^3$ is an independently selected monovalent hydrocarbon group; each $R^4$ is an independently selected alkyl group; each $R^5$ is an independently selected divalent hydrocarbon group, each R'' is independently a (meth)acrylate polymer or copolymer, each $R^6$ is independently selected from the group consisting of a hydroxyl group and an aliphatically unsaturated monovalent hydrocarbon group, each $R^7$ is an independently selected monovalent hydrocarbon group free of aliphatic unsaturation, subscript p≥0, subscript q≥0, subscript k≥0, a quantity (p+q+k)≥1, subscript r≥0, subscript s≥0, subscript t≥0, subscript u≥0, a quantity (r+t)≥2, and a quantity (p+q+k+r+s+t+u) is sufficient to provide a molecular weight of at least 50 kDa to the poly(meth)acrylate grafted polyorganosiloxane.

Alternatively, subscript w is 1 or 2. Alternatively, subscript p is 0 to 2, alternatively 1 or 2. Alternatively, subscript q is 0 to 100. Alternatively, subscript k<5; alternatively k may be 0, 1, or 2; and alternatively k=0. Alternatively, a quantity (p+q+k) is 1 to 100. Alternatively, subscript r is 0 to 2. Alternatively, subscript s is 0 to 100. Alternatively, subscript t is 0 to 100. Alternatively, subscript u is 0 to 2. Alternatively, the quantity (p+q+r+s+t+u) is sufficient to provide a molecular weight of 50 kDa to 1,000 kDa, alternatively 60 kDa to 1,000 kDa, alternatively 50 kDa to 600 kDa, and alternatively 60 kDa to 300 kDa, to the poly(meth)acrylate grafted polyorganosiloxane. Alternatively, the quantity (p+r+u)=2. Alternatively, a quantity (p+q) is 1 to 100. Alternatively, a quantity (r+t) is 1 to 100. Alternatively, the quantity (p+q+r+s+t+u) is sufficient to provide a molecular weight of 50 kDa to 1,000 kDa to the functional polyorganosiloxane.

Alternatively, in the unit formula for the poly(meth)acrylate grafted polyorganosiloxane above, each $R^3$ may have 1 to 18 carbon atoms. Alternatively, each $R^3$ may be an alkyl group of 1 to 6 carbon atoms. Alternatively, each $R^4$ may have 1 to 6 carbon atoms. Alternatively, each $R^4$ may be an alkyl group of 1 to 6 carbon atoms. Alternatively, each $R^5$ may have 1 to 18 carbon atoms. Alternatively, each $R^5$ may be an alkylene group of 2 to 8 carbon atoms. Alternatively, each $R^6$ may be a hydroxyl group or an alkenyl group of 2 to 18 carbon atoms. Alternatively, each $R^6$ may be a hydroxyl group or an alkenyl group selected from vinyl, allyl and hexenyl. Alternatively, two or more instances of $R^6$, per molecule, may be hydroxyl groups. Alternatively, two or more instances of $R^6$, per molecule, are aliphatically unsaturated monovalent hydrocarbon groups. Alternatively, each $R^6$ may be a hydroxyl group. Alternatively, each $R^7$ may have 1 to 18 carbon atoms. Alternatively, each $R^7$ may be an alkyl group of 1 to 6 carbon atoms. Alternatively, each R" may have a DP of 1 to 1,000; alternatively 5 to 600.

Radical Reaction Curable Hybrid Pressure Sensitive Adhesive Composition

The poly(meth)acrylate grafted polyorganosiloxane described above is starting material (I-A) useful in radical reaction curable hybrid PSA compositions (hybrid PSA composition). The hybrid PSA composition may comprise: (I) a pressure sensitive adhesive base comprising a physical mixture of starting materials (I-A) and (I-B), a reaction product of starting materials (I-A) and (I-B), or a combination of both the physical mixture and the reaction product, in an amount sufficient to provide 15 weight % to 40 weight % of starting material (I-A) and 5 weight % to 60 weight % of starting material (I-B); where starting material (I-A) is the poly(meth)acrylate grafted polyorganosiloxane described above and starting material (I-B) is a polyorganosilicate resin. Alternatively, starting material (I-A) may be present in an amount of 17 weight % to 25 weight %. Alternatively, starting material (I-B) may be present in an amount of 25 weight % to 40 weight %. Alternatively, the base may comprise the reaction product of starting materials (I-A) and (I-B). Alternatively, starting material (I-A) may have all or a portion of $R^6$ as hydroxyl groups, and the base may comprise the reaction product of starting materials (I-A) and (I-B). The hybrid PSA composition further comprises (II) a peroxide catalyst. The hybrid PSA composition may optionally further comprise (Ill) a solvent.

(I-B) Polyorganosilicate Resin

The polyorganosilicate resin for use as starting material (I-B) in the hybrid PSA composition is an MQ resin consisting essentially of $R^{14}_3SiO_{1/2}$ units and $SiO_{4/2}$ units, where each $R^{14}$ is independently selected from the group consisting of a hydroxyl group and a monovalent hydrocarbon group. The monovalent hydrocarbon group for $R^{14}$ may be selected from the group consisting of an alkyl group of 1 to 18 carbon atoms, and an alkenyl group of 2 to 18 carbon atoms, and an aryl group or aralkyl group of 6 to 18 carbon atoms. Suitable alkyl groups, alkenyl groups, aryl groups, and aralkyl groups are as defined below. Alternatively each $R^{14}$ may be a hydroxyl group or an alkyl group, such as methyl.

Alternatively, the polyorganosilicate resin may comprise unit formula: $(R^{15}_2R^{16}SiO_{1/2})_x(R^{15}_3SiO_{1/2})_y(SiO_{4/2})_z$, where $R^{15}$ is an alkyl group, an aryl group, or an aralkyl group, such as methyl and phenyl; and $R^{16}$ is an alkenyl group of 2 to 18 carbon atoms, such as vinyl, allyl or hexenyl; subscript x≥0, subscript y≥0, subscript z>0, a quantity (x+y)>0, and subscripts x, y, and z have values such that 0.9≤(x+y)/z≤1.3. Alternatively, the polyorganosilicate resin may comprise unit formula (III): $(R^{15}_3SiO_{1/2})_w(SiO_{4/2})_z$, where each $R^{15}$ is as described above, subscript z is as described above, and subscript w>4.

The polyorganosilicate resin may contain an average of 0 to 30 mole percent of alkenyl groups, alternatively 3 to 30 mole percent of alkenyl groups, alternatively 0.1 to 30 mole percent, alternatively 0.1 to 5 mole percent, alternatively 3 to 10 mole percent. The mole percent of alkenyl groups in the resin is the ratio of the number of moles of alkenyl group-containing siloxane units in the resin to the total number of moles of siloxane units in the resin, multiplied by 100.

The Mn of the polyorganosilicate resin is typically greater than 1,500 Da, alternatively >1,500 Da to 8,000 Da, and alternatively 2,000 to 7,500 Da. Mn may be measured by GPC in the method described below.

Methods of making resins are well known in the art. For example, resin may be prepared by treating a resin copolymer produced by the silica hydrosol capping process of Daudt, et al. with at least an endblocking reagent such as hexamethyldisilazane or an alkenyl-containing endblocking agent. The method of Daudt et al., is disclosed in U.S. Pat. No. 2,676,182.

The method of Daudt, et al. involves reacting a silica hydrosol under acidic conditions with a hydrolyzable triorganosilane such as trimethylchlorosilane, a siloxane such as hexamethyldisiloxane, or mixtures thereof, and recovering a copolymer having M-units and Q-units. The resulting copolymers generally contain from 2 to 5 percent by weight of hydroxyl groups.

The resin, which typically contains less than 2% of silicon-bonded hydroxyl groups, may be prepared by reacting the product of Daudt, et al. with an endblocking agent such as an alkenyl group-containing endblocking agent and/or an endblocking agent free of aliphatic unsaturation, in an amount sufficient to provide from 0 to 30 mole percent of unsaturated organic groups in the final product. Examples of endblocking agents include, but are not limited to, silazanes, siloxanes, and silanes. Suitable endblocking agents are known in the art and exemplified in U.S. Pat. Nos. 4,584,355; 4,591,622; and 4,585,836. A single endblocking agent or a mixture of such agents may be used to prepare the resin.

Various suitable polyorganosilicate resins are commercially available from sources such as Dow Silicones Corporation of Midland, MI, U.S.A., Momentive Performance Materials of Albany, N.Y., U.S.A., and Bluestar Silicones USA Corp. of East Brunswick, N.J., U.S.A. For example, DOWSIL™ MQ-1600 Solid Resin, DOWSIL™ MQ-1601 Solid Resin, and DOWSIL™ 1250 Surfactant, DOWSIL™ 7466 Resin, and DOWSIL™ 7366 Resin, all of which are commercially available from Dow Silicones Corporation of Midland, Michigan, USA, are suitable for use herein. Such resins may be supplied in organic solvent.

(II) Peroxide

Starting material (II) in the hybrid PSA composition is a radical cure catalyst comprising an organic peroxide compound. Suitable organic peroxide compounds include dibenzoyl peroxide; 4-monochlorobenzoyl peroxide; dicumyl peroxide; tert-butylperoxybenzoate; tert-butyl cumyl peroxide; tert-butyloxide 2,5-dimethyl-2,5-di-tert-butylperoxyhexane; 2,4-dichlorobenzoyl peroxide; di-tertbutylperoxy-diisopropyl benzene; 1,1-bis(tert-butylperoxy)-3,3,5-trimethylcyclohexane; 2,5-di-tert-butylperoxyhexane-3,2,5-dimethyl-2,5-bis(tert-butylperoxy) hexane, or cumyl-tert-butyl peroxide. Starting material (III) may be one organic peroxide compound or a combination of two or more organic peroxide compounds. Alternatively, starting material (II) may be benzoyl peroxide.

The amount of starting material (II) added to the hybrid PSA composition depends on various factors including the type and amount of catalyst selected, the selection of starting materials A) and B), and whether starting material A) has hydroxyl groups or aliphatically unsaturated groups (for $R^6$). However, starting material (II) may be present in an amount of at least 2 weight % based on combined weights of starting materials (I), (II), and (III). Alternatively, when each $R^6$ in starting material (A) is hydroxyl then the peroxide catalyst is present in an amount of 2 weight % to 4 weight %. Alternatively, when each $R^6$ in starting material (A) is the aliphatically unsaturated monovalent hydrocarbon group, then the peroxide catalyst is present in an amount of at least 3 weight %, alternatively 3 weight % to 4 weight %.

(III) Solvent

A solvent may optionally be used in the hybrid PSA composition described herein. The solvent may facilitate flow of the hybrid PSA composition and introduction of certain starting materials, such as the polyorganosilicate resin and/or the peroxide compound. Solvents used herein are those that help fluidize the starting materials of the hybrid PSA composition but essentially do not react with the starting materials. The solvent may be selected based on solubility of the starting materials in the hybrid PSA composition and volatility. The solubility refers to the solvent being sufficient to dissolve and/or disperse starting materials of the hybrid PSA composition. Volatility refers to vapor pressure of the solvent. If the solvent is too volatile (having too high vapor pressure) bubbles may form in the hybrid PSA composition during the curing reaction, and the bubbles may cause cracks or otherwise weaken or detrimentally affect properties of the reaction product. However, if the solvent is not volatile enough (too low vapor pressure) the solvent may remain as a plasticizer in the reaction product of the hybrid PSA composition.

The solvent may comprise an organic solvent. The organic solvent can be an alcohol such as methanol, ethanol, isopropanol, butanol, or n-propanol; a ketone such as acetone, methyl ethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether; a halogenated hydrocarbon such as dichloromethane, 1,1,1-trichloroethane or methylene chloride; chloroform;

dimethyl sulfoxide; dimethyl formamide, acetonitrile; tetrahydrofuran; white spirits; mineral spirits; naphtha; n-methyl pyrrolidone; or a combination thereof. Alternatively, the solvent may be selected from the group consisting of ethyl acetate, benzene, toluene, xylene, heptanes, tetrahydrofuran, and a combination of two or more thereof.

Suitable solvents include polyorganosiloxanes with suitable vapor pressures, such as hexamethyldisiloxane, octamethyltrisiloxane, hexamethylcyclotrisiloxane and other low molecular weight polyorganosiloxanes, such as 0.5 to 1.5 cSt DOWSIL™ 200 Fluids and DOWSIL™ OS FLUIDS, which are commercially available from Dow Silicones Corporation of Midland, Michigan, U.S.A.

The amount of solvent will depend on various factors including the type of solvent selected and the amount and type of other starting materials selected. However, the amount of solvent may range from 0 to 70 weight %, alternatively 2 weight % to 50 weight %, and alternatively 40 weight % to 60 weight %, based on the weight of all starting materials in the hybrid PSA composition. The solvent can be added during preparation of the hybrid PSA composition, for example, to aid mixing and delivery of one or more starting materials. All or a portion of the solvent may optionally be removed after the hybrid PSA composition is prepared.

Method of Making the Hybrid PSA Composition

The hybrid PSA composition can be prepared by a method comprising combining all starting materials by any convenient means such as mixing at RT. The method may further comprise delivering one or more starting materials in a solvent (e.g., the polyorganosilicate resin and/or the peroxide catalyst) may be dissolved in a solvent when combined with one or more of the other starting materials in the hybrid PSA composition, and thereafter all or substantially all of the solvent may be removed by conventional means such as stripping and/or distillation, optionally with reduced pressure.

When making the hybrid PSA composition, starting material (I-A) the grafted polyorganosiloxane, and starting material (I-B) the polyorganosilicate resin may be combined to form the base concurrently with combining (II) the peroxide and (III) the solvent, if any, e.g., by mixing all starting materials in any order. Alternatively, the base may be prepared by combining starting material (I-A) and starting material (I-B) before adding (II) the peroxide.

In one embodiment, starting material (I-A) the grafted polyorganosiloxane and starting material (I-B) the polyorganosilicate resin may be combined by physically mixing at ambient temperature. Alternatively, one or both of starting materials (I-A) and (I-B) may be dissolved in (III) the solvent before physically mixing.

In an alternative embodiment, starting materials (I-A) and (I-B) may be reacted to form the base before adding starting material (II) the peroxide. For example, when starting material (I-A) contains hydroxyl groups for $R^6$, a hybrid pressure sensitive adhesive base may be prepared by a method comprising:
1) combining starting materials comprising:
   (I-A) the functional polyorganosiloxane having poly(meth)acrylate groups, wherein said functional polyorganosiloxane comprises the unit formula described above and has two or more instances of $R^6$ per molecule are hydroxyl groups,
   (I-B) the polyorganosilicate resin described above, optionally (III) a solvent, described above, optionally (I-C) a silyl phosphate, and
   (I-D) a condensation reaction catalyst; thereby preparing a reaction mixture; thereby forming a reaction product of starting materials (I-A) and (I-B) and a by-product;
2) removing all or a portion of the by-product during and/or after step 1);

The method may further comprise:
3) combining (II) the peroxide catalyst (described above) and optionally adding further additional (III) solvent to the reaction product in step 2); thereby forming the polyorganosiloxane hybrid pressure sensitive adhesive composition.

Step 1) may be performed by any convenient means such as mixing. Step 1) may be performed under inert conditions, e.g., nitrogen or other inert gas. Combining the starting materials may be performed at ambient temperature. Solvent may optionally be added, e.g., to facilitate combining the starting materials. Starting material (I-C) is a silyl phosphate that may be used in step 1), e.g., to neutralize impurities. The amount of starting material (I-C), when present may be up to 0.02 weight %. Silyl phosphates and methods for their preparation are described, for example, in U.S. Pat. Nos. 4,177,200; 5,099,051 and 5,481,014 and the references cited therein.

Starting material (I-D) the condensation reaction catalyst used in step 1) may be a carboxylic acid. Some useful carboxylic acids include, but are not limited to, propanoic acid, 2-methyl propanoic acid, butanoic acid, pentanoic acid (valeric acid), hexanoic acid (caproic acid), 2-ethylhexanoic acid, heptanoic acid, hexanoic acid, octanoic acid (caprylic acid), oleic acid, linoleic acid, linolenic acid, cyclohexanecarboxylic acid, cyclohexylacetic acid, cyclohexenecarboxylic acid, benzoic acid, benzeneacetic acid, propanedioic acid (malonic acid), butanedioic acid (succinic acid), hexanedioic acid (adipic acid), 2-butenedioic acid (maleic acid), lauric acid, stearic acid, myristic acid, palmitic acid, isoanoic acid, or a combination of two or more thereof. In one embodiment, the acidic compound may be a mixture comprising branched alkyl carboxylic acids. In one embodiment, the acidic compound is a mixture of mainly tertiary aliphatic C10 carboxylic acids. The amount depends on various factors including the type of starting materials (I-A) and (I-B) and the amount of hydroxyl groups. However, the amount of starting material (I-D) may be 0.1 weight % to 5 weight %, alternatively 0.1 weight % to 1 weight %, based on combined weights of all starting materials.

Step 2) may be performed by heating the resulting mixture, e.g., to reflux of the solvent selected. When the starting materials react, a by-product is produced. The by-product may comprise water. All or a portion of the by-product may be removed during and/or after step 1). Without wishing to be bound by theory, it is thought that removing by-product may drive the reaction to completion. By-product may be removed by any convenient means, such as stripping.

Step 3) may be performed by combining (II) the peroxide catalyst and optionally (III) additional solvent to the reaction product of starting materials (I-A) and (I-B) from step 2) by any convenient means such as mixing at ambient temperature.

Adhesive Article

The hybrid PSA composition prepared as described above may be used to form an adhesive article, e.g., a hybrid PSA (prepared by curing the hybrid PSA composition described above) on a substrate. The method may, therefore, further comprise applying the hybrid PSA composition to a substrate.

Applying the hybrid PSA composition to the substrate can be performed by any convenient means. For example, the hybrid PSA composition may be applied onto a substrate by gravure coater, comma coater, offset coater, offset-gravure coater, roller coater, reverse-roller coater, air-knife coater, or curtain coater.

The substrate can be any material that can withstand the curing conditions (described below) used to cure the hybrid PSA composition to form the hybrid pressure sensitive adhesive on the substrate. For example, any substrate that can withstand heat treatment at a temperature equal to or greater than 120° C., alternatively 150° C. is suitable. Examples of materials suitable for such substrates including plastic films such as polymethylmethacrylate (PMMA), polyimide (PI), polyetheretherketone (PEEK), polyethylene naphthalate (PEN), liquid-crystal polyarylate, polyamideimide (PAI), polyether sulfide (PES), polyethylene terephthalate (PET), polyethylene (PE), or polypropylene (PP). Alternatively, the substrate may be a plastic as described above coated on a paper backing. Alternatively, the substrate may be a metal foil such as aluminum foil or copper foil. The thickness of the substrate is not critical; however, the thickness may be 5 micrometers to 300 micrometers.

Alternatively, the substrate may be a fluorosilicone release liner, such as any one of the substrates described above coated with a fluorosilicone release coating.

To improve bonding of the hybrid PSA to the surface of the substrate, the method for forming the adhesive article may optionally further comprise treating the surface of the substrate before applying the hybrid PSA composition. Treating the surface of the substrate may be performed by any convenient means, such as applying a primer, or subjecting the substrate to corona-discharge treatment, etching, or plasma treatment before applying the hybrid PSA composition to the surface of the substrate.

An adhesive article such as a film or tape may be prepared by applying the hybrid PSA composition described above onto the surface of the substrate described above. When solvent is present, the method may optionally further comprise removing all, or a portion, of the solvent before and/or during curing. Removing solvent may be performed by any convenient means, such as heating at a temperature that vaporizes the solvent without fully curing the hybrid PSA composition, e.g., heating at a temperature of 70° C. to 120° C., alternatively 50° C. to 100° C., and alternatively 70° C. to 80° C. for a time sufficient to remove all or a portion of the solvent (e.g., 30 seconds to 1 hour, alternatively 1 minute to 5 minutes).

Curing the hybrid PSA composition (and removing solvent, when solvent is present) may be performed by heating at a temperature of 80° C. to 210° C., alternatively 90° C. to 205° C., alternatively 100° C. to 205° C., and alternatively 110° C. to 200° C. for a time sufficient to cure the hybrid PSA composition (e.g., for 30 seconds to an hour, alternatively 1 to 5 minutes). This forms a hybrid PSA on the surface of the substrate. Curing may be performed by placing the substrate in an oven. The amount of the hybrid PSA composition to be applied to the surface of the substrate depends on the specific application, however, the amount may be sufficient such that after curing thickness of the hybrid PSA may be 5 micrometers to 100 micrometers, and for protective film the thickness may be 6 micrometers to 50 micrometers, alternatively 8 micrometers to 40 micrometers, and alternatively 10 to 30 micrometers.

The method described herein may optionally further comprise applying a removable release liner to the hybrid PSA opposite the substrate, e.g., to protect the hybrid PSA before use of the adhesive article. The release liner may be applied before, during or after curing the hybrid PSA composition; alternatively after curing.

Alternatively, when the hybrid PSA is formed on the release liner, then the method further comprises applying a substrate (as described above) to the hybrid PSA after cure.

EXAMPLES

These examples are intended to illustrate the invention and should not be interpreted as limiting the scope set forth in the claims. Starting Materials used in the Examples are shown below in Table 2.

TABLE 2

| Abbreviation | Description | Function | Source |
|---|---|---|---|
| | Starting Materials | | |
| BMA | butyl methacrylate | i) (meth)acrylate monomer | The Dow Chemical Company |
| MMA | methyl methacrylate | i) (meth)acrylate monomer | The Dow Chemical Company |
| HSPrMeSi(OMe)$_2$ | (3-mercaptopropyl)methyldimethoxysilane | ii) alkoxysilane | Millipore Sigma |
| HSPrMe$_2$SiOMe | (3-mercaptopropyl)dimethylmethoxysilane | ii) alkoxysilane | Synthesized in Reference Example J, below |
| tAPPiv | tert-amyl peroxypivalate, 75% solution in mineral spirits | iii) free radical initiator | Akzo Nobel, Trigonox 125-C75 |
| tBPPiv | tert-butyl peroxypivalate, 75% solution in mineral spirits | iii) free radical initiator | Akzo Nobel, Trigonox 25-C75 |
| EtOAc | ethyl acetate | iv) solvent | Fisher Scientific |
| OH terminated PDMS 1 | bis hydroxy terminated polydimethylsiloxane with DP = 32 | B2) hydroxyl functional polydiorganosiloxane | Dow Silicones Corporation |
| Vi-terminated PDMS 1 | bis vinyl terminated polydimethylsiloxane with DP = 48 | B1) unsaturated polydiorganosiloxane | Dow Silicones Corporation |

TABLE 2-continued

Starting Materials

| Abbreviation | Description | Function | Source |
|---|---|---|---|
| Phosphazene Catalyst 1 | 1% of  where subscript o has an average value of 2 and $Z^-$ is $PCl_6^-$ in 99% of dichloromethane | C) condensation reaction catalyst | Dow Silicones Corporation |
| 4-7042 | a mixture of hydroxy-terminated, poly(dimethyl, methylvinyl siloxane) and alpha-hydroxy-terminated, omega-methoxy-terminated, poly(dimethyl, methylvinyl siloxane) | B1) where B has both Vi and OH | DOWSIL ™ 4-7042 is commercially available from Dow Silicones Corporation |
| $MD_{22}M$ | trimethyl-siloxy terminated polydimethylsiloxane with DP = 22 | D) polydialkylsiloxane | Dow Silicones Corporation |
| Neutralizer | trioctylamine | F) neutralizing agent | Millipore Sigma |
| Toluene | toluene | solvent | Fisher Scientific |
| Heptanes | heptanes | solvent | Fisher Scientific |
| THF | tetrahydrofuran | solvent | Fisher Scientific |
| Resin 1 | A solution of 74.7% of a polyorganosilicate resin having $(Me_3SiO_{1/2})$ and $(SiO_{4/2})$ units, where Me represents a methyl group, with a Mn of 4,130 Da by GPC; dissolved in balance of solvent | I-B) polyorganosilicate resin | Dow Silicones Corporation |
| Resin 2 | A solution of 65.4% of a polyorganosilicate resin having $(Me_3SiO_{1/2})$ and $(SiO_{4/2})$ units, where Me represents a methyl group, with a Mn of 1,760 Da by GPC; dissolved in balance of solvent | I-B) polyorganosilicate resin | Dow Silicones Corporation |
| Silyl phosphate solution | A mixture of 68% bis(trimethylsilyl) hydrogen phosphate, 24% trimethylsilyl dihydrogen phosphate, 4% tris(trimethylsilyl)phosphate and 4% hexamethyldisiloxane. The mixture (10%) was dissolved in xylene (90%). | I-C) silyl phosphate | Dow Silicones Corporation |
| OH terminated PDMS 2 | Bis hydroxy terminated polydimethylsiloxane with DP = 3,857 | Polyorganosiloxane without poly(meth)acrylate graft used for Benchmark | Dow Silicones Corporation |
| Benzoic acid | Benzoic acid, crystalline | I-D) condensation reaction catalyst | |
| Dibenzoyl peroxide | Dibenzoyl peroxide | (II) peroxide catalyst | Sigma-Aldrich, Luperox ™ A98 |

In this Reference Example A is provided as a description of the process used to produce Macromonomer Example MM-1 (100 BMA, nomenclature refers to weight percent and BMA=butyl methacrylate) with 1.9 weight percent (3-mercaptopropyl)methyldimethoxysilane based-on-monomer. Ethyl acetate (EtOAc) was dried over molecular sieves and other ingredients were used as supplied. A monomer mixture containing EtOAc (75 g), BMA (370 g) and (3-mercaptopropyl)methyldimethoxysilane (7 g) was prepared. EtOAc (100 g) and were added to a 4-neck 1-liter glass reactor equipped with a condenser and overhead mixer. The mixture was heated to 77° C. and sparged with nitrogen for 30 minutes. Trigonox 125-C75 (tAPPiv, 1 g) in EtOAc (10 g) was added to the reactor and held for 5 minutes. The temperature was slowly ramped to 85° C. and then the monomer mixture was fed at 0.1 mL/min for 180 min and an initiator solution (20 g of EtOAc; 2 g of Trigonox 125-C75) was fed over 240 min (180 min plus 60 min overfeed after monomer feed ends). The reaction was held at 85° C. for 180 min following the end of the initiator feed, and then the resulting mixture was allowed to cool to room temperature. The resulting mixture was dried in a vacuum oven.

In this Reference Example B is provided as a description of the process used to produce Macromonomer Example MM-2 (37 BMA/63 MMA, nomenclature refers to weight percent and BMA=butyl methacrylate and MMA=methyl methacrylate) with 8.2 weight percent (3-mercaptopropyl) methyldimethoxysilane based-on-monomer. The process was used to prepare another alkoxysilyl-functional (meth) acrylate macromonomer (Example MM-3) by varying appropriate starting materials and their amounts, as shown below in Table 3. A monomer mixture of toluene (5 g), MMA (252 g), BMA (148 g) and (3-mercaptopropyl)methyldimethoxysilane (36 g) was prepared. Toluene (80 g) was added to a 4-neck 1 liter glass reactor equipped with a condenser and overhead mixer. The solvent was heated to 85° C. and then the monomer mixture (441 g) was fed over a period of 1 hour and the initiator solution (30 g of toluene and 16.5 g of Trigonox 25-C75 tBPPiv) was fed over a period of 3 hours. At 2 hours a BA (butyl acrylate, 10 g) chase was added over a period of 30 minutes. The reaction was held at 85° C. for 80 min following the end of the initiator feed, and then the mixture was allowed to cool to room temperature and collected. For MM-2, the reaction mixture was diluted with 160 g of toluene prior to collection, for MM-3 no additional dilution was required.

TABLE 3

Summary of alkoxysilyl-functional (meth)acrylate macromonomers Prepared in Reference Examples A-B

| Macro-monomer ID | % BMA | Initiator | Initiator (mole % BOM*) | CTA (moles % BOM) | $T_{g,Fox}$ (° C.) | Reference Example |
|---|---|---|---|---|---|---|
| MM-1 | 100 | tAppiv | 0.4 | 1.5 | 20 | A |
| MM-2 | 37 | tBPPiv | 2.0 | 6.6 | 68 | B |
| MM-3 | 100 | tBPPiv | 2.8 | 7.1 | 20 | B |

*BOM = based-on-monomers

TABLE 4

Characterization results of alkoxysilyl-functional (meth)acrylate macromonomers

| Macromonomer ID | $M_n/M_w{}^a$ (kDa) | PDI$^a$ | Residual Monomer (ppm)$^b$ | % Silicone condensed$^c$ |
|---|---|---|---|---|
| MM-1 | 8.0/15.6 | 2.0 | 382 BMA | 0 |
| MM-2 | 2.3/4.2 | 1.8 | 153 BMA & MMA | ND$^d$ |
| MM-3 | 2.3/4.2 | 1.8 | 184 BMA | ND |

Figure 3:
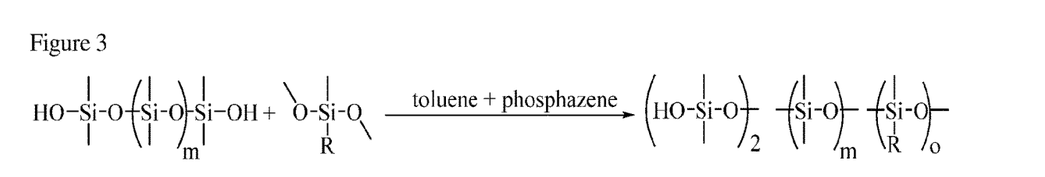
FIG. 3 shows a representative example of Scheme 3 for making a bis-hydroxyl-terminated poly(meth)acrylate grafted polyorganosiloxane described below in Reference Example C.

$^a$Molecular weight distribution measured on a GPC using THF as the eluent.
$^b$Residual monomer concentration measured by HS-GC. A sample of the reaction mixture (~20 mg) was added to a vial in addition to an internal standard (~20 mg), and the vial was crimped. Head-space gas chromatography was performed by heating the vial and sampling the headspace to determine ppm levels of residual monomer.
$^c$Percent condensation of siloxane moieties measured by $^{29}$Si NMR.
$^d$ND = not determined In this Example C, Grafted Polysiloxane GP-1, a bis-hydroxyl-terminated polydimethylsiloxane having pendant polybutylmethacrylate groups was synthesized as follows. A 1-liter 4-neck round-bottom flask with a stirring rod and blade was pre-weighed and recorded prior to the start of the experiment. To this flask was added 181.3 grams OH terminated PDMS 1, 18.17 grams of the macromonomer of Example MM-1 (which had Mn=8,000 g/mol and BMA=100%), and 239.61 grams of toluene were charged into the round-bottom flask equipped with an overhead mechanical stirrer, thermocouple, and a Dean Stark apparatus with a water-cooled condenser attached to a nitrogen bubbler. When the pot temperature reached 80-100° C. under nitrogen blanket, 0.47 mL of Phosphazene Catalyst 1 was added. As the reaction mixture continued to heat, the water, methanol, and toluene distillate was collected in a Dean Stark apparatus. Heating was discontinued after distilling enough toluene to obtain a final concentration of 50% solids solution. Upon reaching the final concentration of 50% solids, 0.20 mL of trioctylamine was added to the reaction flask under stirring to neutralize the reaction mixture and the resulting mixture was allowed to cool to room temperature. After cooling to room temperature, the round-bottom flask with stirring rod and blade was weighed and recorded. The NVC was then calculated based on the mass balance (difference between pre-weight and final weight) assuming that all of the polymers content remained in the flask.

Figure 1:
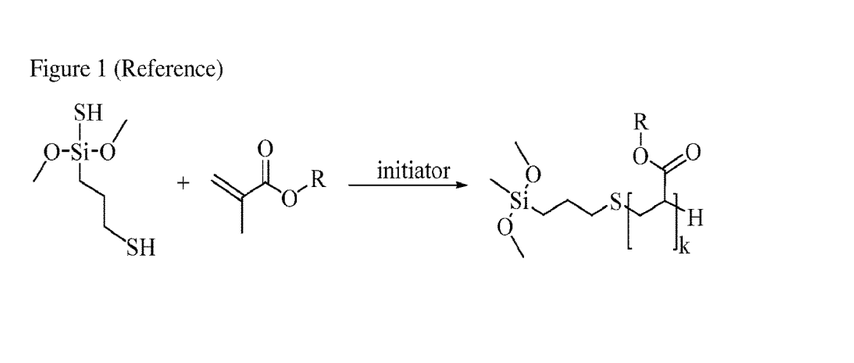
FIG. 1 shows a representative example of Scheme 1 in which a (meth)acrylate polymer is grown off a thiol-functionality after a hydrogen atom is abstracted either from a free radical initiator fragment or a growing chain. The (meth)acrylate oligomer is then terminated/endcapped with a hydrogen atom from a different thiol molecule, thereby forming an alkoxysilyl-functional (meth)acrylate macromonomer. This is described below in Reference Example A.
Figure 2:
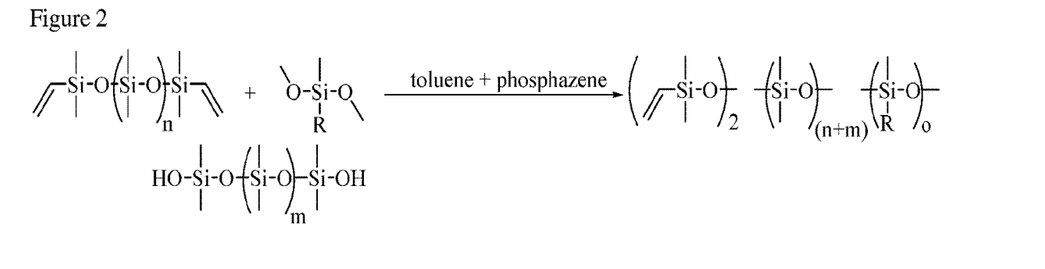
FIG. 2 shows a representative example of Scheme 2 for making a bis-vinyl-terminated poly(meth)acrylate grafted polyorganosiloxane described below in Reference Example D.

In this Reference Example D, the alkoxysilyl-functional (meth)acrylate macromonomers of Examples MM-1 to MM-3 above were used to prepare poly(meth)acrylate grafted polyorganosiloxanes. Example D is provided as a description of the process used to produce Grafted Polysiloxane GP-2: A 1-liter 4-neck round-bottom flask with a stirring rod and blade was pre-weighed and recorded prior to the start of the experiment. To this flask was added 181.0 grams OH terminated PDMS 1, 5.65 grams of Vi-terminated PDMS 1, 3.73 grams of the Example MM-2 (which had Mn=2.3 kDa and BMA=37%), and 238 grams of toluene were charged into the round-bottom flask equipped with an overhead mechanical stirrer, thermocouple, and a Dean Stark apparatus with a water-cooled condenser attached to a nitrogen bubbler. The heating mantle was plugged into a temperature controller to prevent the reaction mixture from heating to temperatures greater than 120° C. When the pot temperature reached 80° C., 0.47 mL of Phosphazene Catalyst 1 was added. As the reaction mixture continued to heat to 101° C., the water, methanol, and toluene distillate was collected in a Dean Stark apparatus. Heating was discontinued after distilling enough toluene to obtain a final concentration of ~60% solids solution, typically by removal of 45-100 g of distillate. Upon reaching the final concentration of 60% solids, 0.20 mL of trioctylamine was added to the reaction flask under stirring to neutralize the reaction mixture and the resulting mixture was allowed to cool to room temperature. After cooling to room temperature, the round-bottom flask with stirring rod and blade was weighed and recorded. The NVC was then calculated based on the mass balance (difference between pre-weight and final weight) assuming that all of the polymers content remained in the flask. Additionally, the vinyl content of the solution was calculated.

Example GP-3 to GP-6 were repeated using the procedure in Reference Example D, described above, except replacing the alkoxysilyl-functional (meth)acrylate macromonomers prepared in Example MM-2 with a different alkoxysilyl-functional (meth)acrylate macromonomer and changing the wt. % of the alkoxysilyl-functional (meth)acrylate macromonomers. These examples are listed in Table 5.

TABLE 5

Summary of synthesized PDMS and selected properties prepared in Reference Examples C-D

| Grafted Polysiloxane ID | Macro-monomer ID | Acrylic fraction (wt. %) | Si—Ac Polymer Mw$^a$ (kDa) | PDI$^a$ | Reference Example |
|---|---|---|---|---|---|
| GP-1 | MM-1 | 10 | 468 | 1.53 | C |
| GP-2 | MM-2 | 2 | 191 | 1.90 | D |
| GP-3 | MM-3 | 2 | 204 | 1.76 | D |
| GP-4 | MM-2 | 10 | 208 | 2.00 | D |
| GP-5 | MM-3 | 10 | 197 | 1.95 | D |
| GP-6 | MM-1 | 10 | 202 | 1.77 | D |

$^a$MW and PDI determined by GPC analysis
*ultra high MW material might be present but was filtered out in GPC injection
Preparation of Reacted Silicone Pressure Sensitive Adhesive Composition For the Benchmark, a silicone PSA was prepared using a 500-milliliter 3-neck round-bottom flask with a stirring rod and blade. 56.60 grams OH terminated PDMS 2, 90.66 grams Resin 2, 34.02 grams Resin 1, 67.97 grams toluene, and 0.30 grams silyl phosphate solution were charged into the flask equipped with an overhead mechanical stirrer, thermocouple, and a Dean Stark apparatus with a water-cooled condenser attached to a nitrogen bubbler. The heating mantle was plugged into a temperature controller to prevent the reaction mixture from heating to temperatures greater than 175° C. Stirring was initiated and allowed to continue until the materials became a homogeneous mixture. 0.44 grams of benzoic acid was added at room temperature and heating commenced. Reflux was observed at 120° C. Water and aromatic solvent (toluene, xylene) distillate was collected in a Dean Stark apparatus. Heating was discontinued after two hours. The resulting PSA cooled to ~50° C. and was poured off. Preparation of Reacted Hybrid Pressure Sensitive Adhesive Composition In this Example E, Hybrid PSA-1 was prepared using a 500-milliliter 3-neck round-bottom flask with a stirring rod and blade. 112.91 g bis-hydroxyl-terminated polydimethylsiloxane having pendant polybutylmethacrylate groups synthesized as described above for GP-1 (NVC=50.03%), 11.68 g solvent (toluene), 90.66 g Resin 2, 34.02 g Resin 1, and 0.31 g silyl phosphate solution were charged into the flask equipped with an overhead mechanical stirrer, thermocouple, and a Dean Stark apparatus with a water-cooled condenser attached to a nitrogen bubbler. The heating mantle was plugged into a temperature controller to prevent the reaction mixture from heating to temperatures greater than 175° C. Stirring was initiated and allowed to continue until the materials became a homogeneous mixture. 0.45 grams of benzoic acid was added at room temperature and heating commenced. Reflux was observed at 95° C. Water and aromatic solvent (toluene, xylene) distillate was collected in a Dean Stark apparatus. Heating was discontinued after two hours. The resulting PSA cooled to ~50° C. and was poured off. Preparation of Physical Mixture Polyorganosiloxane Hybrid Pressure Sensitive Adhesive Compositions In this Reference Example F, the poly(meth)acrylate grafted polyorganosiloxanes of Examples GP-1 to GP-5 above were used to prepare Hybrid PSAs. Example F is provided as a description of the process used to produce Hybrid PSA-2. In a glass vial, the following starting materials were combined and mixed: 11.28 g grafted polyorganosiloxane GP-1, 11.35 g Resin 1, and 2.35 g xylene. A 10% dibenzoyl peroxide solution (dibenzoyl peroxide dissolved in 90% toluene) was prepared. 15.00 g PSA-2, dibenzoyl peroxide solution according to desired peroxide level, and optionally toluene according to desired NVC were charged to a SpeedMixer™ cup and mixed on a FlackTek SpeedMixer™ for 30 seconds at 3,000 RPM.

Example PSA-3 to PSA-7 were repeated using the procedure in Reference Example F, described above, except replacing the grafted polyorganosiloxane prepared in Example GP-1 with a different grafted polyorganosiloxane. These examples are listed in Table 6 and Table 7.

TABLE 6

Summary of hybrid pressure sensitive adhesives prepared in Reference Examples E-F

| PSA ID | Grafted Poly-siloxane ID | Polymer functionality | Condensation Catalyst | Dibenzoyl peroxide level, % | Reference Example |
|---|---|---|---|---|---|
| Benchmark | NA | OH | Benzoic acid | 2 | |
| PSA-1 | GP-1 | OH | Benzoic acid | 2 | E |
| PSA-2 | GP-1 | OH | NA | 2 | F |
| PSA-3 | GP-2 | Vinyl | NA | 2 | F |
| PSA-4 | GP-2 | Vinyl | NA | 3 | F |
| PSA-5 | GP-3 | Vinyl | NA | 3 | F |
| PSA-6 | GP-4 | Vinyl | NA | 3 | F |
| PSA-7 | GP-5 | Vinyl | NA | 3 | F |

TABLE 7

Summary of hybrid pressure sensitive adhesives and selected properties prepared in Reference Examples E-F

| PSA ID | PMMA Adhesion (grams/inch) | Tack (grams) | 'Wet' Release Force (grams/inch) | 'Dry' Release Force (grams/inch) |
|---|---|---|---|---|
| Benchmark | 1049 | ND | 173 | ND |
| PSA-1 | 1148 | 793 | 201 | ND |
| PSA-2 | 997 | 842 | fail | 31 |
| PSA-3 | 1305 | 684 | fail | ND |
| PSA-4 | 1141 | 850 | fail | 33 |
| PSA-5 | 1342 | 763 | fail | 56 |
| PSA-6 | 841 | 919 | fail | 10 |
| PSA-7 | 1179 | 829 | fail | 23 |

Comparative Example PSA-8—Curing with 1% Dibenzoyl Peroxide

In this Comparative Example PSA-8, GP-2, Resin 1, and xylene were added to a glass vial in the same ratios as PSA-3 and PSA-4, using the procedure in Reference Example F. Comparative Example PSA-8 differed by adding dibenzoyl peroxide to a desired level of 1%. Table 8 shows the same PSA compositions, only differing by dibenzoyl peroxide level. At least 2% dibenzoyl peroxide was required to achieve cure.

TABLE 8

Summary of hybrid pressure sensitive adhesives cured at differing dibenzoyl peroxide levels and selected properties

| PSA ID | Dibenzoyl peroxide level, % | PMMA Adhesion (grams/inch) | Tack (grams) | 'Wet' Release Force (grams/inch) | 'Dry' Release Force (grams/inch) |
|---|---|---|---|---|---|
| Comp PSA-8 | 1 | did not cure | did not cure | did not cure | ND |
| PSA-3 | 2 | 1305 | 684 | fail | ND |
| PSA-4 | 3 | 1141 | 850 | fail | 33 |

Comparative Example PSA-9—Physical Mixture Hybrid PSA Using Vinyl Functional Grafted Polyorganosiloxane In this Comparative Example PSA-9, a hybrid PSA was prepared using the procedure in Reference Example F, described above, except replacing the grafted polyorganosiloxane prepared in Example GP-1 with GP-6. Table 9 shows the same macromonomer's use in varying hybrid PSAs. Table 10 shows selected properties. Comparative PSA-9 was a physical mixture using a vinyl functional grafted polysiloxane; this resulted in failing 'wet' and 'dry' release force. PSA-2 was a physical mixture using a OH functional grafted polysiloxane; this resulted in passing 'dry' release but failing 'wet' release. PSA-1 was reacted using a OH functional grafted polysiloxane; this resulted in passing 'wet' and 'dry' release force.

TABLE 9

Summary of hybrid pressure sensitive adhesives sharing the same macromonomer.

| PSA ID | Macro-monomer ID | Grafted Polysiloxane ID | Polymer function-ality | Conden-sation Catalyst | Dibenzoyl peroxide level, % |
|---|---|---|---|---|---|
| Comp PSA-9 | MM-1 | GP-6 | Vinyl | NA | 3 |
| PSA-2 | MM-1 | GP-1 | OH | NA | 2 |
| PSA-1 | MM-1 | GP-1 | OH | Benzoic acid | 2 |

TABLE 10

Summary of hybrid pressure sensitive adhesives sharing the same macromonomer and selected properties

| PSA ID | PMMA Adhesion (grams/inch) | Tack (grams) | 'Wet' Release Force (grams/inch) | 'Dry' Release Force (grams/inch) |
|---|---|---|---|---|
| Comp PSA-9 | 444 | 513 | fail | fail |
| PSA-2 | 997 | 842 | fail | 31 |
| PSA-1 | 1148 | 793 | 201 | ND |

Reference Example G—Film Sample Preparation

Create films: a sheet of paper was placed on a vacuum plate with vacuum on, then a 2-mil thick sheet of polyester or a 2-mil thick sheet of polyester coated with fluorosilicone release coating was placed over the paper. The desired composition prepared as described above for Reference Example F was poured onto the polyester or polyester coated with fluorosilicone release coating and a 4-mil coating bar was used to make a film. The film was placed in a Despatch™ oven; each sheet was dried at 80° C. for 2 minutes, then cured at 180° C. for 2 minutes.

Reference Example H—GPC Experimental Details

The molecular weight data was determined by analysis on a Waters 2695 model GPC. The poly(meth)acrylate grafted polyorganosiloxanes were dissolved in THF at a concentration of 5 mg solids/mL, and filtered through 0.45 μm PTFE syringe filters prior to injection of a 100 μL aliquot of the sample. The GPC was equipped with two Polymer Laboratories PLgel 5 μm Mixed-C columns (300 mm×7.5 mm), preceded by a PLgel 5 μm guard column (50 mm×7.5 mm) at a flow rate of 1.0 mL/min at 35° C. Detection was performed using a Waters 2410 differential refractive index detector. A conventional calibration of 16 narrow polystyrene standards covering the range of 580 g/mole to 2,300,000 g/mole and fit to a third order polynomial curve.

Reference Example I—NMR $^{29}$Si NMR spectra were acquired on an Agilent 500 MHz DD2 (mi-MR-06) system equipped with a 16 mm silicon free AutoX probe. The samples were prepared with $CDCl_3$+ 0.02M $Cr(acac)_3$ in a Si-free Teflon NMR tube. Standard parameters were applied except nt=1024. $^1$H NMR spectra were acquired on a Bruker Avance III HD NMR spectrometer equipped with a 5 mm TCI H C/Si cryoprobe (mi-MR-07). The samples were prepared with $CDCl_3$ in a 5 mm NMR tube. Standard parameters were applied.

Reference Example J—Synthesis of $HSPrMe_2SiOMe$

A 3 M solution of $CH_3MgBr$ in diethyl ether (50 mL, 0.15 mol) was added dropwise to a solution of 3-mercaptopropyltrimethoxysilane (8.5 g, 0.043 mol) in 50 mL of THF, while the temperature was kept between 0 and 10° C. The reaction mixture was stirred for 1 h at 0° C. and then treated dropwise with $CH_3OH$ (40 mL). The solid was filtered. The crude material was used directly into the next reaction. 5.4 g was collected to give a 75% yield of pure product. NMR is consistent with the literature reference, Agina, E. V., *ACS Applied Materials & Interfaces*, 2015, 22, 11755-11764.

Reference Example K—Peel Adhesion (PMMA)

A 1-inch×8½ strip was cut from the 2-mil polyester film prepared as described in Reference Example G and transferred to a clean PMMA panel by using a ~5-pound roller. Peel adhesion(180°) was tested according to PSTC-101 standards. A TMI Release and Adhesion Tester was used to pull a 1-inch wide strip of hybrid PSA at 12 inches per minute. Results were reported in grams/inch. A sample passed if it showed adhesive failure/clean removal of the strip from the PMMA panel.

Reference Example L—Tack

Tack was tested according to ASTM D-2979. A PT-1000 Probe Tack Tester was used to obtain tack measurements from hybrid PSA samples coated onto 2-mil polyester film prepared as described in Reference Example G. Dwell time was set to 1.0 sec. Results were reported in grams.

Reference Example M—'Wet' Release Force

Hybrid PSA composition samples prepared as described in Reference Example G, using a 2-mil thick sheet of polyester coated with fluorosilicone release coating, were nipped with 2-mil thick sheet of polyester to make a laminate (release liner/adhesive/2 mil polyester film). Release was measured using a TMI Release and Adhesion Tester by pulling the release liner side of the laminate from the polyester film side of a 1-inch wide strip of laminate at 12 inches per minute.

Reference Example N—'Dry' Release Force

Hybrid PSA composition samples prepared as described in Reference Example G, using a 2-mil thick sheet of polyester, were nipped with 2-mil thick sheet of polyester coated with fluorosilicone release coating to make a laminate (release liner/adhesive/2 mil polyester film). Release was measured using a TMI Release and Adhesion Tester by pulling the release liner side of the laminate from the polyester film side of a 1-inch wide strip of laminate at 12 inches per minute.

Definitions and Usage of Terms

The SUMMARY and ABSTRACT are hereby incorporated by reference. Table 7 shows the abbreviations used herein.

TABLE 7

Abbreviations

| Abbreviation | Definition |
|---|---|
| BMA | Butyl methacrylate |
| Da | Daltons |
| g | grams |
| HS-GC | Headspace gas chromatography measured as described above |
| GPC | gel permeation chromatography |
| kDa | kilo Daltons |
| L | liters |
| M | molar |
| mg | milligrams |
| MHz | megaHertz |
| min | minutes |
| mL | milliliters |
| mm | millimeters |
| MMA | Methyl methacrylate |
| mmole | millimoles |
| Mn | number average molecular weight determined by GPC |
| Mw | weight average molecular weight determined by GPC |
| MW | Molecular weight |
| NMR | nuclear magnetic resonance |
| NVC | non-volatile content |
| PDI | polydispersity determined by GPC |
| PDMS | polydimethylsiloxane |
| ppm | parts per million, by weight |
| RT | room temperature of 20° C. to 25° C. |
| μm | micrometer |

All amounts, ratios, and percentages are by weight unless otherwise indicated. The articles 'a', 'an', and 'the' each refer to one or more, unless otherwise indicated by the context of the specification. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an aryl group, or an aralkyl group includes the member alkyl individually; the subgroup alkyl and aryl; and any other individual member and subgroup subsumed therein.

"Alkyl" means an acyclic, branched or unbranched, saturated monovalent hydrocarbon group. Alkyl is exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbon groups of 6 or more carbon atoms.

"Alkenyl" means an acyclic, branched or unbranched monovalent hydrocarbon group having a double bond between two carbon atoms. Alkenyl is exemplified by, but not limited to, vinyl, allyl, butenyl, pentenyl, and hexenyl, including branched and linear species.

"Aryl" means a cyclic, fully unsaturated, hydrocarbon group. Aryl is exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms.

"Aralkyl" means an alkyl group having a pendant and/or terminal aryl group or an aryl group having a pendant alkyl group. Exemplary aralkyl groups include tolyl, xylyl, benzyl, phenylethyl, phenyl propyl, and phenyl butyl.

"Carbocycle" and "carbocyclic" each mean a hydrocarbon ring. Carbocycles may be monocyclic or alternatively may be fused, bridged, or spiro polycyclic rings. Monocyclic carbocycles may have 3 to 9 carbon atoms, alternatively 4 to 7 carbon atoms, and alternatively 5 to 6 carbon atoms. Polycyclic carbocycles may have 7 to 17 carbon atoms, alternatively 7 to 14 carbon atoms, and alternatively 9 to 10 carbon atoms. Carbocycles may be saturated or partially unsaturated.

"Cycloalkyl" means saturated carbocycle. Monocyclic cycloalkyl groups are exemplified by cyclobutyl, cyclopentyl, and cyclohexyl.

"Halogenated hydrocarbon" means a hydrocarbon where one or more hydrogen atoms bonded to a carbon atom have been formally replaced with a halogen atom. Halogenated hydrocarbon groups include haloalkyl groups, halogenated carbocyclic groups, and haloalkenyl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4, 3,3-nonafluorohexyl, and 8,8,8,7,7-pentafluorooctyl; and chlorinated alkyl groups such as chloromethyl and 3-chloropropyl. Halogenated carbocyclic groups include fluorinated cycloalkyl groups such as 2,2-difluorocyclopropyl, 2,3-difluorocyclobutyl, 3,4-difluorocyclohexyl, and 3,4-difluoro-5-methylcycloheptyl; and chlorinated cycloalkyl groups such as 2,2-dichlorocyclopropyl, 2,3-dichlorocyclopentyl. Haloalkenyl groups include chloroallyl.

The term "(meth)acrylic acid" as used herein and in the appended claims is intended to serve as a generic expression embracing either or both of acrylic acid and methacrylic acid.

The term "(meth)acrylate" as used herein and in the appended claims is intended to serve as a generic expression embracing either or both of acrylate and methacrylate.

"M-unit" means a siloxane unit having formula $R_3SiO_{1/2}$, where each R independently represents a monovalent atom or organic group. "D-unit" means a siloxane unit having formula $R_2SiO_{2/2}$, where each R independently represents a monovalent atom or group. "T-unit" means a siloxane unit having formula $RSiO_{3/2}$, where each R independently represents a monovalent atom or group. "Q-unit" means a siloxane unit having formula $SiO_{4/2}$.

The invention claimed is:

1. A polyorganosiloxane hybrid pressure sensitive adhesive composition comprising:
   (I) a pressure sensitive adhesive base comprising a physical mixture of starting materials (I-A) and (I-B), a reaction product of starting materials (I-A) and (I-B), or a combination of both the physical mixture and the reaction product, in an amount sufficient to provide 15 weight % to 40 weight % of starting material (I-A) and 5 weight % to 60 weight % of starting material (I-B); where
   starting material (I-A) is a functional polyorganosiloxane having poly(meth)acrylate groups, wherein said functional polyorganosiloxane comprises unit formula:
   $[R^3_w(R^5-S-R")(OR^4)_{(2-w)}Si-O_{1/2}]_p[R^3_v(R^5-S-R")(OR^4)_{(1-v)}Si-O_{2/2}]_q[(R^5-S-R")Si-O_{3/2}]_k(R^6R^7_2SiO_{1/2})_r(R^7_2SiO_{2/2})_s(R^6R^7SiO_{2/2})_t(R^7_3SiO_{1/2})_u$,
   where each subscript w is independently 0, 1, or 2, each subscript v is independently 0 or 1, each $R^3$ is an independently selected monovalent hydrocarbon group; each $R^4$ is an independently selected alkyl group; each $R^5$ is an independently selected divalent hydrocarbon group, each R'' is independently a (meth) acrylate polymer or copolymer, each $R^6$ is selected from the group consisting of a hydroxyl group and an aliphatically unsaturated monovalent hydrocarbon group, each $R^7$ is an independently selected monovalent hydrocarbon group free of aliphatic unsaturation, subscript p≥0, subscript q≥0, subscript k≥0, a quantity (p+q+k)≥1, subscript r≥0, subscript s≥0, subscript t≥0, subscript u≥0, a quantity (r+t)≥1, and a quantity (p+q+k+r+s+t+u) is sufficient to provide a molecular weight of at least 50 kDa to the polyorganosiloxane; and starting material (I-B) is a polyorganosilicate resin comprising unit formula $(R^{15}_2R^{16}SiO_{1/2})_x(R^{15}_3SiO_{1/2})_y(SiO_{4/2})_z$, where $R^{15}$ is an alkyl group, an aryl group, or an aralkyl group, such as methyl and phenyl; and $R^{16}$ is an alkenyl group of 2 to 18 carbon atoms, such as vinyl, allyl or hexenyl; subscripts x, y, and z are mole fractions; subscript x≥0, subscript y≥0, subscript z>0, a quantity (x+y)>0, a quantity (x+y+z)≤1, subscripts x, y, and z have values such that 0.9≤x+y)/z≤1.3; the polyorganosilicate resin further comprises a hydroxyl group content up to 5 weight % based on weight of the polyorganosilicate resin; and the polyorganosilicate resin has a number average molecular weight>1,500 Da to 8,000 Da measured by gel permeation chromatography;

(II) a peroxide catalyst, wherein when each $R^6$ in starting material (I-A) is hydroxyl then the peroxide catalyst is present in an amount of 2 weight % to 4 weight %, and when each $R^6$ in starting material (I-A) is the aliphatically unsaturated monovalent hydrocarbon group then the peroxide catalyst is present in an amount of 3 weight % to 4 weight %; and 0 to 70 weight % of (III) a solvent; wherein all percentages are by weight based on combined weights of all starting materials in the polyorganosiloxane hybrid pressure sensitive adhesive composition.

2. The composition of claim 1, where in starting material (I-A), $R^3$ has 1 to 18 carbon atoms, $R^4$ has 1 to 6 carbon atoms, $R^5$ has 1 to 18 carbon atoms, $R^6$ is hydroxyl or an alkenyl group of 2 to 18 carbon atoms, and $R^7$ has 1 to 18 carbon atoms, R'' has a has a DP of 1 to 1,000; a quantity (p+r+u)=2, subscript k=0, a quantity (p+q) is 1 to 100, a quantity (r+t) is 1 to 100, a quantity (p+q+r+s+t+u) is sufficient to provide a molecular weight of 50 kDa to 1,000 kDa to the functional polyorganosiloxane.

3. The composition of claim 2, where subscript p is 1 or 2, each $R^3$ is an alkyl group of 1 to 6 carbon atoms, each $R^4$ is an alkyl group of 1 to 6 carbon atoms, each $R^5$ is an alkylene group of 2 to 8 carbon atoms, R'' has a DP of 5 to 600, each $R^6$ is hydroxyl or an alkenyl group selected from vinyl and hexenyl, and each $R^7$ is an alkyl group of 1 to 6 carbon atoms.

4. The composition of claim 1, where in starting material (I-B), subscript x=0, and the polyorganosilicate resin comprises unit formula: $(R^{15}_3SiO_{1/2})_w(SiO_{4/2})_z$, where subscript w>4.

5. The composition of claim 1, where the peroxide catalyst is selected from the group consisting of dibenzoyl peroxide; 4-monochlorobenzoyl peroxide; dicumyl peroxide; tert-butylperoxybenzoate; tert-butyl cumyl peroxide; tert-butyloxide 2,5-dimethyl-2,5-di-tert-butylperoxyhexane; 2,4-dichlorobenzoyl peroxide; di-tertbutylperoxy-diisopropyl benzene; 1,1-bis(tert-butylperoxy)-3,3,5-trimethylcyclohexane; 2,5-di-tert-butylperoxyhexane-3,2,5-dimethyl-2,5-bis(tert-butylperoxy) hexane; cumyl-tert-butyl peroxide; and a combination of two or more thereof.

6. The composition of claim 5, where the peroxide catalyst comprises dibenzoyl peroxide.

7. The composition of claim 1, where the solvent is present, and the solvent comprises an aromatic hydrocarbon.

8. The composition of claim 7, where the solvent is selected from the group consisting of ethyl acetate, benzene, toluene, xylene, heptanes, tetrahydrofuran, and a combination of two or more thereof.

9. The composition of claim 1, where starting material (I-A) is present in an amount of 17 weight % to 25 weight %; starting material (I-B) is present in an amount of 25 weight % to 40 weight %; starting material (III) is present in an amount of 40 weight % to 60 weight %; wherein all percentages are by weight based on combined weights of all starting materials in the composition.

10. The composition of claim 1, where in starting material (I-A), two or more instances of $R^6$, per molecule, are hydroxyl groups.

11. The composition of claim 1, where in starting material (I-A), two or more instances of $R^6$, per molecule, are aliphatically unsaturated monovalent hydrocarbon groups.

12. A method for preparing a polyorganosiloxane hybrid pressure sensitive adhesive composition according to claim 10, wherein the method comprises:

1) combining starting materials comprising
   (I-A) the functional polyorganosiloxane having poly(meth)acrylate groups, wherein said functional polyorganosiloxane comprises unit formula: $[R^3_w(R^5—S—R'')(OR^4)_{(2-w)}Si—O_{1/2}]_p[R^3_v(R^5—S—R'')(OR^4)_{(1-v)}Si—O_{2/2}]_q[(R^5—S—R'')Si—O_{3/2}]_k(R^6R^7_2SiO_{1/2})_r(R^7_2SiO_{2/2})_s(R^6R^7SiO_{2/2})_t(R^7_3SiO_{1/2})_u$, where each subscript w is independently 0, 1, or 2, each subscript v is independently 0 or 1, each $R^3$ is an independently selected monovalent hydrocarbon group; each $R^4$ is an independently selected alkyl group; each $R^5$ is an independently selected divalent hydrocarbon group, each R'' is independently a (meth)acrylate polymer or copolymer, each $R^6$ is selected from the group consisting of a hydroxyl group and an aliphatically unsaturated monovalent hydrocarbon group with the proviso that two or more instances of $R^6$ per molecule are hydroxyl groups, each $R^7$ is an independently selected monovalent hydrocarbon group free of aliphatic unsaturation, subscript p≥0, subscript q≥0, subscript k≥0, a quantity (p+q+k)≥1, subscript r≥0, subscript s≥0, subscript t≥0, subscript u≥0, a quantity (r+t)≥1, and a quantity (p+q+k+r+s+t+u) is sufficient to provide a molecular weight of at least 50 kDa to the polyorganosiloxane;
   (I-B) the polyorganosilicate resin,
   optionally (III) the solvent,
   optionally (I-C) a silyl phosphate, and
   (I-D) a condensation reaction catalyst; thereby preparing a reaction mixture comprising a reaction product of starting materials (I-A) and (I-B) and a by-product;
2) removing all or a portion of the by-product during and/or after step 1); 3) adding (II) the peroxide catalyst and optionally adding further additional (III) solvent to the reaction product in step 2); thereby forming the polyorganosiloxane hybrid pressure sensitive adhesive composition.

13. A hybrid polyorganosiloxane pressure sensitive adhesive composition prepared by the method of claim 12.

14. A method for preparing a polyorganosiloxane hybrid pressure sensitive adhesive composition according to claim 11, wherein the method comprises:
1) combining starting materials comprising
   (I-A) the functional polyorganosiloxane having poly(meth)acrylate groups, wherein said functional polyorganosiloxane comprises unit formula: $[R^3_w(R^5-S-R'')(OR^4)_{(2-w)}Si-O_{1/2}]_p[R^3_v(R^5-S-R'')(OR^4)_{(1-v)}Si-O_{2/2}]_q[(R^5-S-R'')Si-O_{3/2}]_k(R^6R^7_2SiO_{1/2})_r(R^7_2SiO_{2/2})_s(R^6R^7SiO_{2/2})_t(R^7_3SiO_{1/2})_u$, where each subscript w is independently 0, 1, or 2, each subscript v is independently 0 or 1, each $R^3$ is an independently selected monovalent hydrocarbon group; each $R^4$ is an independently selected alkyl group; each $R^5$ is an independently selected divalent hydrocarbon group, each R" is independently a (meth)acrylate polymer or copolymer, each $R^6$ is selected from the group consisting of a hydroxyl group and an aliphatically unsaturated monovalent hydrocarbon group with the proviso that two or more instances of $R^6$ per molecule are an aliphatically unsaturated monovalent hydrocarbon group, each $R^7$ is an independently selected monovalent hydrocarbon group free of aliphatic unsaturation, subscript p≥0, subscript q≥0, subscript k≥0, a quantity (p+q+k)≥1, subscript r≥0, subscript s≥0, subscript t≥0, subscript u≥0, a quantity (r+t)≥1, and a quantity (p+q+k+r+s+t+u) is sufficient to provide a molecular weight of at least 50 kDa to the polyorganosiloxane;
(I-B) the polyorganosilicate resin,
(II) the peroxide catalyst, and
optionally (III) the solvent, thereby forming the polyorganosiloxane hybrid pressure sensitive adhesive composition.

* * * * *